United States Patent
Hirai et al.

(10) Patent No.: US 7,457,222 B2
(45) Date of Patent: Nov. 25, 2008

(54) OPTICAL ELEMENT, OPTICAL PICKUP UNIT, AND OPTICAL DISK DRIVE UNIT

(75) Inventors: Hideaki Hirai, Kanagawa (JP); Shigeru Ohuchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/707,010

(22) Filed: Feb. 16, 2007

(65) Prior Publication Data
US 2007/0147218 A1    Jun. 28, 2007

Related U.S. Application Data

(63) Continuation of application No. 11/373,234, filed on Mar. 13, 2006, now Pat. No. 7,197,003, which is a continuation of application No. 10/086,442, filed on Mar. 4, 2002, now Pat. No. 7,050,380.

(30) Foreign Application Priority Data

Mar. 7, 2001  (JP)  ............... 2001-063513
Sep. 21, 2001  (JP)  ............... 2001-290046

(51) Int. Cl.
- G11B 7/00  (2006.01)
- G02B 27/14  (2006.01)

(52) U.S. Cl. .................... 369/112.01; 369/44.23; 359/634

(58) Field of Classification Search ............... 359/634, 359/636; 369/44.23, 112.01
See application file for complete search history.

(56) References Cited

U.S. PATENT DOCUMENTS

| 5,428,588 | A | 6/1995 | Ohuchida |
| 5,684,779 | A | 11/1997 | Ohuchida et al. |
| 5,974,020 | A | 10/1999 | Ju et al. |
| 6,009,066 | A | 12/1999 | Yoo et al. |
| 6,266,314 | B1 | 7/2001 | Fukakusa et al. |
| 6,876,619 | B1 | 4/2005 | Jutte |
| 7,050,380 | B2 * | 5/2006 | Hirai et al. ............ 369/112.17 |
| 7,197,003 | B2 * | 3/2007 | Hirai et al. ............ 369/112.01 |
| 7,301,864 | B2 * | 11/2007 | Horinouchi et al. ...... 369/44.37 |
| 2001/0026523 | A1 | 10/2001 | Ohuchida et al. |
| 2002/0018433 | A1 | 2/2002 | Ohuchida |

FOREIGN PATENT DOCUMENTS

| JP | 6-295464 | 10/1994 |
| JP | 9-180207 | 7/1997 |
| JP | 11-261171 | 9/1999 |

* cited by examiner

Primary Examiner—David N Spector
(74) Attorney, Agent, or Firm—Dickstein Shapiro LLP

(57) ABSTRACT

An optical pickup unit includes first and second light sources of first and second wavelengths, respectively, a diachronic element, a phase plate, and an objective lens. One of the first and second light sources is selected so that information recording or reproduction is performed by converging a light beam emitted from the selected one of the first and second light sources on an optical recording medium via the diachronic element, the phase plate, and the objective lens.

6 Claims, 20 Drawing Sheets

650nm  780nm

410nm 650nm 780nm

OPTICAL ELEMENT, OPTICAL PICKUP UNIT, AND OPTICAL DISK DRIVE UNIT

CROSS REFERENCE TO RELATED APPLICATIONS

The present application is a continuation of U.S. application Ser. No. 11/373,234, filed on Mar. 13, 2006, which in turn is a continuation of U.S. application Ser. No. 10/086,442, filed Mar. 4, 2002, (now U.S. Pat. No. 7,050,380, issued May 23, 2006), the disclosures of which are herewith incorporated by reference in their entirety.

BACKGROUND OF THE INVENTION

1. Field of the Invention

The present invention relates to optical elements, optical pickup units, and optical disk drive units, and more particularly to an optical pickup unit employed in an optical disk drive unit that can record information on and/or reproduce information from optical recording media of a plurality of types such as a compact disk (CD) type and a digital versatile disk (DVD) type, an optical element employed in such an optical pickup unit, and an optical disk drive unit employing such an optical pickup unit.

2. Description of the Related Art

Conventional optical disk drive units that can record information on and/or reproduce information from both DVD-type optical disks such as DVDs and S-DVDs and CD-type optical disks such as CDs, CD-Rs, and CD-RWs require two light sources of different wavelengths. That is, a light source of a red region of 630 to 680 nm is used for the DVD-type optical disks and a light source of a near infrared (IR) region of 770 to 800 nm is used for the CD-type optical disks. Information can be recorded on or reproduced from the CD-type media excluding the CD-Rs by a red light source. The CD-Rs require a near IR light source for information recording or reproduction since the CD-Rs, which employ a pigment compound for their recording layers, have a narrow absorption bandwidth, so that information cannot be recorded thereon or reproduced therefrom by the red light source.

In the case of requiring two light sources as described above, the simplest way is to mount two optical pickup units separately for DVDs and CDs in an optical disk drive unit. At this point, by setting the wavelength $\lambda$ of the light source of the CD optical pickup unit to 785 nm, the CD-Rs may be used for information recording or reproduction. However, it is difficult to achieve downsizing and cost reduction of the optical disk drive unit by this method employing the two optical pickup units.

Accordingly, two optical systems are provided in the housing of one optical pickup unit. FIG. 1 is a diagram showing a conventional optical pickup unit including two optical systems.

In FIG. 1, a linearly polarized divergent light emitted from a semiconductor laser (LD) 101 of a wavelength of 660 nm for the DVD optical system is formed into a substantially parallel light by a collimator lens (CL) 102 to travel through a polarization beam splitter (PBS) 103. Further, the light passes through a ¼ wave plate (phase plate) 105 for 660 nm to be circularly polarized in a first direction. Thereafter, the light passes through a dichroic prism (dichroic element) 104 and has its light path (emission path) deflected by a deflection prism (DP) 106 by 90°. Then, the light is incident on an objective lens (OL) 107 (a light-converging part) to be converged into a small spot on an optical recording medium 108. Information reproduction, recording, or erasure is performed by the spot. The light reflected back from the optical recording medium 108 is circularly polarized in a second direction reverse to the first direction to be formed again into a substantially parallel light by the OL 107. The light is deflected by the DP 106 and passes through the dichroic prism 104. Then, the light passes through the ¼ wave plate 105 and is linearly polarized to be perpendicular to its emission path. Thereafter, the light is reflected from the PBS 103, formed into a convergent light by a condenser lens (DL) 109, and reaches a light-receiving element (PD) 110. An information signal and servo signals including a tracking-servo signal and a focus-servo signal are detected from the light-receiving element 110.

Next, a description will be given of the CD optical system. In recent optical pickup units for CDs, a hologram unit (HOE unit), which is formed by providing light-emitting and light-receiving elements in one container (can) and separates a bundle of rays by using a hologram (HOE), has been used commonly. In the optical pickup unit of FIG. 1, an HOE unit 201, which is formed by providing a semiconductor laser chip (LD chip) 2011 and a light-receiving element (PD) 2013 in one can to separate a bundle of rays by using a hologram (HOE) 2012, is also provided for the CD optical system.

In FIG. 1, a divergent light of 780 nm emitted from the LD chip 2011 of the HOE unit 201 is coupled by a coupling lens 202 and reflected from the dichroic prism 104. Then, the light has its light path deflected by the DP 106 by 90° and is incident on the OL 107 to be converged into a small spot on the optical recording medium 108. Information recording, reproduction, or erasure is performed by the spot. The light reflected back from the optical recording medium 108 is formed again into a substantially parallel light by the OL 107. The light is deflected by the DP 106 and reflected from the dichroic prism 104. Then, the light is formed into a convergent light by the coupling lens 202, diffracted by the HOE 2012 toward the PD 2013 provided in the same can as the LD chip 2011, and received by the PD 2013. An information signal and servo signals including a tracking-servo signal and a focus-servo signal are detected from the PD 2013. FIG. 2 is an enlarged fragmentary schematic view of the HOE unit 201.

Japanese Laid-Open Patent Application No. 6-295464 discloses an optical pickup unit employing a ¼ wave plate, which serves to improve usability of light in the optical pickup unit. The ¼ wave plate converts a linearly polarized light emitted from a laser light source to a circularly polarized light so that the circularly polarized light is projected on a disk. Further, the ¼ wave plate converts the circularly polarized light reflected from the disk to a light that is linearly polarized in a direction perpendicular to the linearly polarized light emitted from the laser light source and leads the linearly polarized light to a light-receiving element without loss of light. The ¼ wave plate can improve usability of light. However, the light circularly polarized by the ¼ wave plate is prone to have a phase difference on a reflection surface. Therefore, it is desirable that the ¼ wave plate be provided on a light path in the vicinity of an objective lens.

For instance, it is desirable in terms of phase difference management to provide the ¼ wave plate right beneath the objective lens. However, providing the ¼ wave plate right beneath the objective lens causes the problem of an increase in the thickness of an optical drive unit including the optical pickup unit in a vertical direction. Therefore, in order to reduce the thickness of the optical drive unit, the ¼ wave plate may be omitted by providing an upward reflection mirror also provided under the objective lens with the function of the ¼ wave plate.

Recently, there have been developed optical disk drive units called multiwriters that can perform recording and reproduction with respect to media of both CDs and DVDs. In order to enable both CD and DVD recording, a high usability of light is required for each of the two types of media. Consequently, a ¼ wave plate is required that functions as a ¼ wave plate for both lights of a wavelength of 780 nm employed for the CDs and a wavelength of 650 nm employed for the DVDS.

However, a normal wave plate cannot be provided with the function of a perfect ¼ wave plate for both wavelengths. Therefore, the normal wave plate is prevented from providing a phase difference of 90° (a ¼ wavelength) between the incident lights of both wavelengths, but can only provide a slightly increased or decreased phase difference such as 100° or 80°. In such a case, usability of light diminishes for a deviation from 90°.

SUMMARY OF THE INVENTION

As shown in FIG. 1, the optical pickup unit having the light sources of the two different wavelengths enabling both DVD and CD recording and/or reproduction requires a larger number of optical components than an optical pickup unit having a single-wavelength light source, thus facing the significant issues of reduction of the number of assembly processes, downsizing, and cost reduction.

In an optical pickup unit employing such a hologram unit as described above, part of a reflected bundle of rays passing through the hologram as a zero-order diffracted light returns to the light-emission point of a semiconductor laser to vary the oscillation characteristic thereof, so that noise may be generated at the time of recording information on or reproducing information from an optical recording medium. The noise generation caused by the light returning to the semiconductor laser hardly becomes a problem in a reproduction-only optical pickup unit. However, in an optical pickup unit of an information-recordable type that employs a high-output semiconductor laser whose oscillation characteristic is apt to vary, this noise generation tends to be a problem. As an optical pickup unit addressing this problem, Japanese Laid-Open Patent Application No. 11-261171 discloses an optical pickup unit employing a wave plate for controlling returning-light noise in a single-wavelength optical system.

Further, as described above, the optical disk drive units called multiwriters are required to be reduced in size and thickness. This is because smaller mobile personal computers such as notebook personal computers have recently more rapidly proliferated than have desktop personal computers. The drive units are required to be reduced in size and thickness accordingly.

In order to reduce the optical pickup units in size and thickness, there has been proposed a method of downsizing an optical pickup unit which method mounts laser chips and PD chips for CD and DVD optical systems in a single package. Further, since a higher usability of light is required to enable both CD and DVD recording, an optical isolator configuration is employed by using a beam-shaping prism or polarization.

In the case of using the beam-shaping prism, a mirror is required to reflect a light path bent by the beam-shaping prism. However, a light is prone to have a phase difference on a mirror surface when reflected therefrom. The circularly polarized light is elliptically polarized by the phase difference, thus disturbing polarization in the optical isolator configuration and deteriorating usability of light.

The optical isolator configuration not only improves usability of light, but also reduces light returning to a light source, thus having good noise immunity. However, even if the beam-shaping prism is employed to secure a high usability of light, an increase in the number of mirrors causes a phase difference at the time of reflection. The phase difference disturbs polarization in the optical isolator, thus decreasing usability of light. This increases light returning to the light source, therefore deteriorating a signal-to-noise (S/N) ratio. Therefore, there rises the problem of compatibility between downsizing of the optical pickup unit and a high usability of light.

Accordingly, it is a general object of the present invention to provide an optical element, an optical pickup unit, and an optical disk drive unit in which the above-described disadvantages are eliminated.

A more specific object of the present invention is to provide an optical element that is applicable to an optical pickup unit accommodating a plurality of wavelengths for DVD and CD recording or reproduction, for instance, and has a phase plate function of providing a phase difference of a ¼ wavelength to a light beam of a specific wavelength and a reflection mirror function.

Another more specific object of the present invention is to provide an optical pickup unit for DVD and CD recording and reproduction which optical pickup unit employs such an optical element to be reduced in thickness and provided with improved usability of light.

Another more specific object of the present invention is to provide an optical pickup unit for DVD and CD recording and reproduction in which optical pickup unit noise generation due to a returning light to a semiconductor laser is reduced or avoided without an increase in the number of components by using a common dichroic prism, phase plate, and objective lens.

Yet another more specific object of the present invention is to provide an optical disk drive unit employing any of such optical pickup units.

The above objects of the present invention are achieved by an optical pickup unit including first and second light sources of first and second wavelengths, respectively, a dichroic element, a phase plate, and an objective lens, wherein one of the first and second light sources is selected so that information recording or reproduction is performed by converging a light beam emitted from the selected one of the first and second light sources on an optical recording medium via the dichroic element, the phase plate, and the objective lens.

The above-described optical pickup unit uses the same dichroic element, phase plate, and objective lens for the light beams emitted from the two light sources, thereby preventing noise generation due to a returning light with respect to each of the light beams of both wavelengths without increasing the number of components.

The above objects of the present invention are also achieved by an optical pickup unit recording information on or reproducing information from first and second optical recording media of different optical recording formats, the optical pickup unit including first and second light sources emitting lights of first and second wavelengths to be projected onto the first and second recording media, respectively, first and second detection parts detecting reflected lights from the first and second recording media, respectively, a polarization-type light-path splitting part splitting the light emitted from the first light source and a light traveling toward the first detection part, a non-polarization-type light-path splitting part splitting the light emitted from the second light source and a light traveling toward the second detection part, a light-path combination part combining light paths of the lights of the first and second wavelengths, a light-converging part converging the lights of the first and second wavelengths on the first and second optical recording media, respectively, and a phase plate provided between the light-path combination part and the light-converging part.

The above-described optical pickup unit uses the function of its polarization optical system also for its non-polarization optical system, thereby preventing noise generation due to a returning light in the non-polarization optical system without increasing the number of components.

The above objects of the present invention are also achieved by an optical pickup unit recording information on or reproducing information from first and second optical recording media of different optical recording formats, the optical pickup unit including first and second light sources emitting lights of first and second wavelengths to be projected onto the first and second recording media, respectively, first and second detection parts detecting reflected lights from the first and second recording media, respectively, a first non-polarization-type light-path splitting part splitting the light emitted from the first light source and a light traveling toward the first detection part, a second non-polarization-type light-path splitting part splitting the light emitted from the second light source and a light traveling toward the second detection part, a light-path combination part combining light paths of the lights of the first and second wavelengths, a light-converging part converging the lights of the first and second wavelengths on the first and second optical recording media, respectively, and a phase plate provided between the light path combination part and the light-converging part.

The above-describe optical pickup unit can prevent noise generation due to a returning light in both optical systems of the different wavelengths without increasing the number of components, and further, can be reduced in cost by employing the non-polarization-type light path splitting part for each of the wavelengths.

The above objects of the present invention are also achieved by an optical pickup unit recording information on or reproducing information from first and second optical recording media of different optical recording formats, the optical pickup unit including first and second light sources emitting lights of first and second wavelengths to be projected onto the first and second recording media, respectively, first and second detection parts detecting reflected lights from the first and second recording media, respectively, a non-polarization-type light-path splitting part splitting the light emitted from the first light source and the reflected light from the first optical recording medium and splitting the light emitted from the second light source and the reflected light from the second optical recording medium, a light-converging part converging the lights of the first and second wavelengths on the first and second optical recording media, respectively, and a phase plate provided between the non-polarization-type light-path splitting part and the light-converging part.

The above-describe optical pickup unit can prevent noise generation due to a returning light in both optical systems of the different wavelengths without increasing the number of components, and further, can be reduced in cost and size by employing the non-polarization-type light path splitting part for each of the wavelengths.

The above objects of the present invention are also achieved by an optical element including a broadband ¼ wave plate part providing a phase difference of a ¼ wavelength to each of light beams of a plurality of specific wavelengths, a total reflection part reflecting all the light beams of the specific wavelengths, wherein a light beam incident on the optical element is affected twice by the broadband ¼ wave plate part before being emitted from the optical element by being first affected by the broadband ¼ wave plate part, then reflected from the total reflection part, and again incident on the broadband ¼ wave plate part to be affected thereby, and the broadband ¼ wave plate part has a multilayer organic film structure formed to be capable of providing the phase difference of the ¼ wavelength to each of the light beams of the specific wavelengths by selecting and layering one over another a plurality of organic films of different wavelength dispersion characteristics so that wavelength dispersion of each of the organic films is compensated for, the wavelength dispersion characteristics each representing wavelength dependency of a phase difference.

The above objects of the present invention are also achieved by an optical element including a ¼ wave plate part having a function of providing a phase difference of a ¼ wavelength only to at least part of light beams of a plurality of specific wavelengths and a function of providing a given phase difference other than the ¼ wavelength to remaining light beams, and a total reflection part reflecting all of the light beams, wherein a light beam incident on the optical element is affected twice by the ¼ wave plate part before being emitted from the optical element by being first affected by the ¼ wave plate part, then reflected from the total reflection part, and again incident on said ¼ wave plate part to be affected thereby.

The above objects of the present invention are also achieved by an optical element including a wavelength selection and reflection part reflecting part of light beams of a plurality of specific wavelengths and transmitting remaining light beams, a ¼ wave plate part providing a phase difference of a ¼ wavelength to the remaining light beams, and a total reflection part reflecting at least the remaining light beams, wherein a light beam incident on the optical element and transmitted by the wavelength selection and reflection part is affected by the ¼ wave plate part, reflected from the total reflection part, incident again on the ¼ wave plate part to be affected thereby, and passes through the wavelength election and reflection part to be emitted from the optical element.

The above objects of the present invention are also achieved by an optical pickup unit having a function of recording information on or reproducing information from an optical recording medium, the optical pickup unit including: a plurality of semiconductor lasers each capable of emitting a light beam of a specific wavelength; an optical part including a coupling lens and an objective lens to direct the light beam emitted from each of the semiconductor lasers to a recording surface of the optical recording medium, the objective lens converging the light beam on the recording surface; a light-receiving element receiving the light beam reflected and returning from the recording surface; and an optical element provided in a light path between the objective lens and the coupling lens, the optical element including a broadband ¼ wave plate part providing a phase difference of a ¼ wavelength to each of the light beams of the specific wavelengths, and a total reflection part reflecting all of the light beams of the specific wavelengths.

The above objects of the present invention are also achieved by an optical pickup unit having a function of recording information on or reproducing information from an optical recording medium, the optical pickup unit including: a plurality of semiconductor lasers each capable of emitting a light beam of a specific wavelength; an optical part including a coupling lens and an objective lens to direct the light beam emitted from each of the semiconductor lasers to a recording surface of the optical recording medium, the objective lens converging the light beam on the recording surface; a light-receiving element receiving the light beam reflected and returning from the recording surface; and an optical element provided in a light path between the objective lens and the coupling lens, the optical element including a broadband ¼ wave plate part having a function of providing a phase difference of a ¼ wavelength only to at least part of the light beams of the specific wavelengths and a function of providing a given phase difference other than the ¼ wavelength to remaining light beams, and a total reflection part reflecting all of the light beams of the specific wavelengths.

The above objects of the present invention are also achieved by an optical pickup unit having a function of recording information on or reproducing information from an optical recording medium, the optical pickup unit including: a plurality of semiconductor lasers each capable of emitting a light beam of a specific wavelength; an optical part including a coupling lens and an objective lens to direct the light beam emitted from each of the semiconductor lasers to a recording surface of the optical recording medium, the objective lens converging the light beam on the recording surface; a light-receiving element receiving the light beam reflected and returning from the recording surface; and an optical element provided in a light path between the objective lens and the coupling lens, the optical element including a wavelength selection and reflection part reflecting part of the light beams of the specific wavelengths and transmitting remaining light beams, a broadband ¼ wave plate part providing a phase difference of a ¼ wavelength to the remaining light beams transmitted by the wavelength selection and reflection part, and a total reflection part reflecting all of the light beams of the specific wavelengths.

According to any of the above-described optical elements, in a multiple-wavelength pickup unit used for both DVDs and CDs, for instance, usability of light is improved with respect to each of a plurality of wavelengths so that optimization can be realized, thereby achieving high-speed recording. Further, according to any of the above-described optical pickup units, a phase difference caused by reflection can be minimized by circularly polarizing a light beam immediately before the light beam is incident on the objective lens. Further, since any of the optical elements of the present invention can be used for both a (broadband) ¼ wave plate and an upward reflection mirror, the optical pickup units of the present invention are reduced in thickness.

Further, according to the present invention, by providing the phase difference of the ¼ wavelength only to a light beam of a specific wavelength lacking a sufficient LD output, such as a light beam of a wavelength for DVD recording or reproduction usability of light is improved in an optical system for the specific wavelength, and by using a conventional component for an optical system for another wavelength, the optical pickup units of the present invention are reduced in cost. Furthermore, by employing an optical isolator configuration for a light beam of one wavelength so as to provide the phase difference of the ¼ wavelength thereto and employing no polarization for a light beam of another wavelength, the conventional component can be employed so that cost reduction can be realized.

The above objects of the present invention are also achieved by an optical disk drive unit including an optical pickup unit having a function of recording information on or reproducing information from an optical recording medium, the optical pickup unit including: a plurality of semiconductor lasers each capable of emitting a light beam of a specific wavelength; an optical part including a coupling lens and an objective lens to direct the light beam emitted from each of the semiconductor lasers to a recording surface of the optical recording medium, the objective lens converging the light beam on the recording surface; a light-receiving element receiving the light beam reflected and returning from the recording surface; and an optical element provided in a light path between the objective lens and the coupling lens, the optical element including a broadband ¼ wave plate part providing a phase difference of a ¼ wavelength to each of the light beams of the specific wavelengths, and a total reflection part reflecting all of the light beams of the specific wavelengths.

The above objects of the present invention are also achieved by an optical disk drive unit including an optical pickup unit having a function of recording information on or reproducing information from an optical recording medium, the optical pickup unit including: a plurality of semiconductor lasers each capable of emitting a light beam of a specific wavelength; an optical part including a coupling lens and an objective lens to direct the light beam emitted from each of the semiconductor lasers to a recording surface of the optical recording medium, the objective lens converging the light beam on the recording surface; a light-receiving element receiving the light beam reflected and returning from the recording surface; and an optical element provided in a light path between the objective lens and the coupling lens, the optical element including a broadband ¼ wave plate part having a function of providing a phase difference of a ¼ wavelength only to at least part of the light beams of the specific wavelengths and a function of providing a given phase difference other than the ¼ wavelength to remaining light beams, and a total reflection part reflecting all of the light beams of the specific wavelengths.

The above objects of the present invention are further achieved by an optical disk drive unit including an optical pickup unit having a function of recording information on or reproducing information from an optical recording medium, the optical pickup unit including: a plurality of semiconductor lasers each capable of emitting a light beam of a specific wavelength; an optical part including a coupling lens and an objective lens to direct the light beam emitted from each of the semiconductor lasers to a recording surface of the optical recording medium, the objective lens converging the light beam on the recording surface; a light-receiving element receiving the light beam reflected and returning from the recording surface; and an optical element provided in a light path between the objective lens and the coupling lens, the optical element including a wavelength selection and reflection part reflecting part of the light beams of the specific wavelengths and transmitting remaining light beams, a broadband ¼ wave plate part providing a phase difference of a ¼ wavelength to the remaining light beams transmitted by the wavelength selection and reflection part, and a total reflection part reflecting all of the light beams of the specific wavelengths.

The above-described optical disk drive units include the optical pickup units of the present invention so as to be reduced in size and power consumption. Thereby, the above-described optical disk drive units achieve a longer reproduction period and are suitably used as portable drive units.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

First Embodiment

Figure 1:
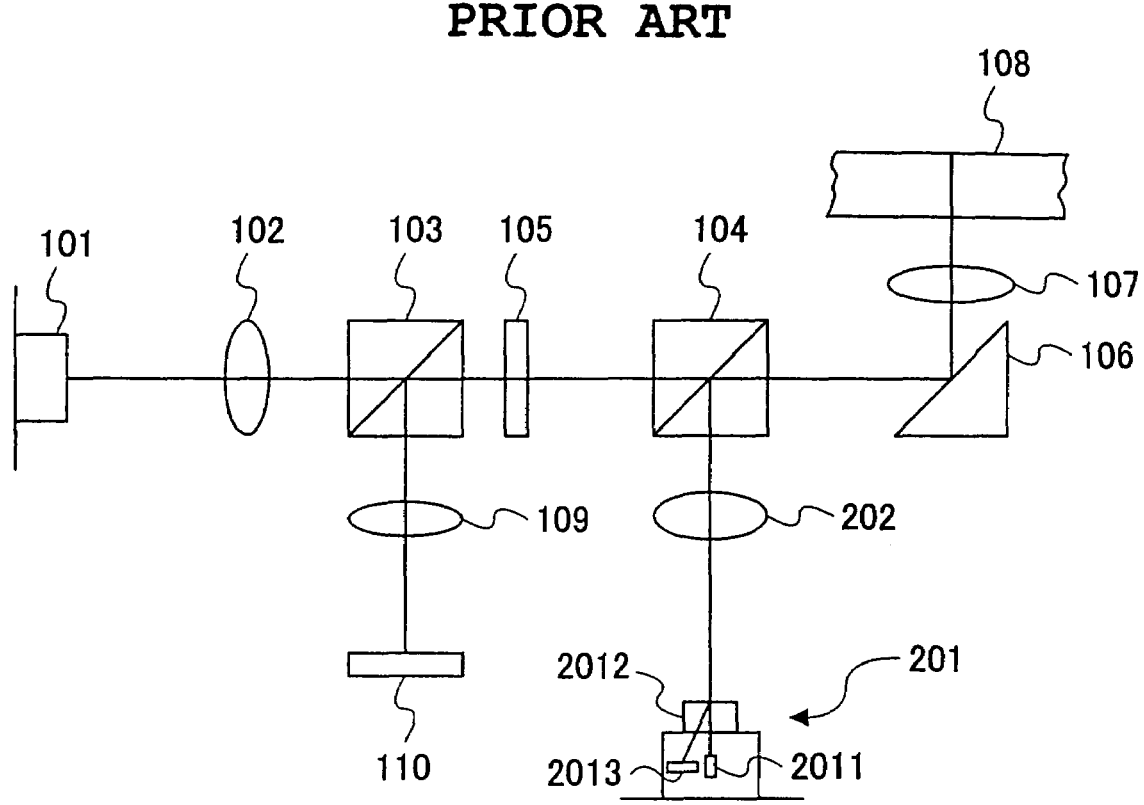
FIG. 1 is a schematic diagram showing a configuration of a conventional optical pickup unit.
Figure 2:
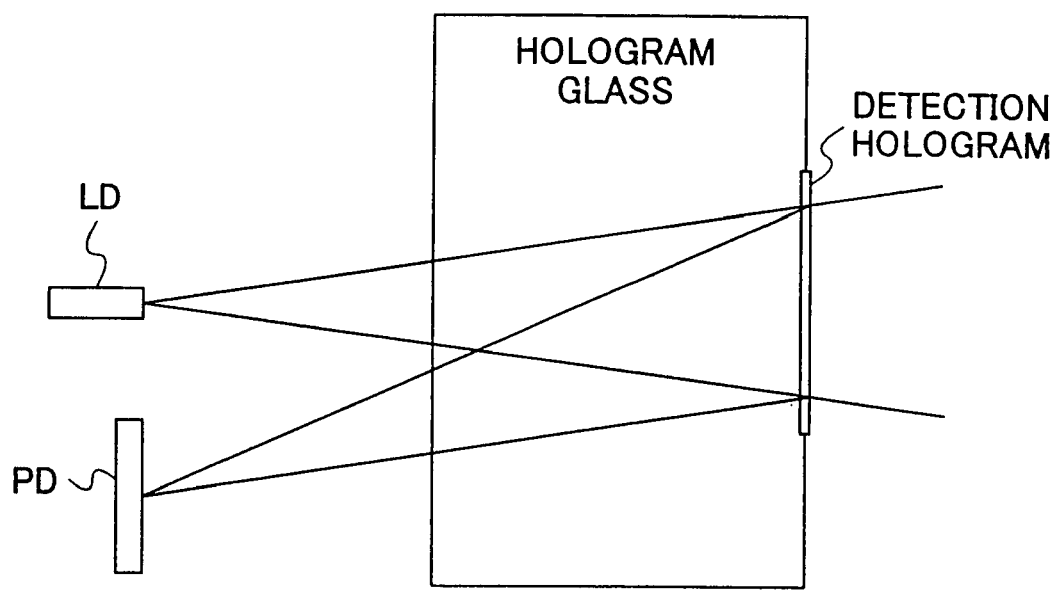
FIG. 2 is an enlarged fragmentary schematic view of an HOE unit of the optical pickup unit of FIG. 1.
Figure 3:
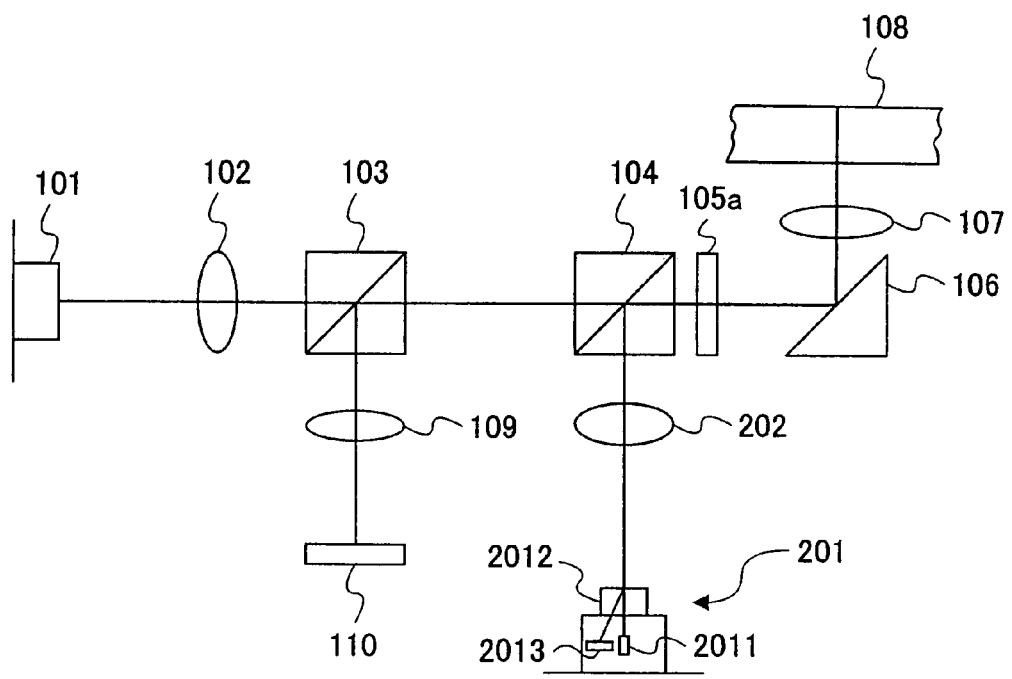
FIG. 3 is a schematic diagram showing a configuration of an optical pickup unit according to a first embodiment of the present invention.

FIG. 3 is a schematic diagram showing a configuration of an optical pickup unit according to a first embodiment of the present invention. In FIG. 3, the same elements as those of FIG. 1 are referred to by the same numerals, and a description thereof will be omitted.

First, a description will be given of the DVD optical system of the optical pickup unit of FIG. 3. At the time of DVD recording or reproduction, a linearly polarized divergent light (light beam) emitted from the LD 101 of a wavelength λ1 (for instance, 660 nm) is formed into a substantially parallel light by the CL 102 and passes through the PBS 103 and the dichroic prism 104. Then, the light passes through a ¼ wave plate (phase plate) 105a accommodating wavelengths of 660 and 780 nm according to the present invention to be circularly polarized in a first direction. Thereafter, the light has its light path (emission path) deflected by the DP 106 by 90° and is incident on the OL 107 to be converged into a small spot on the optical recording medium 108. Information reproduction, recording, or erasure is performed by the spot. The light reflected from the optical recording medium 108 is circularly polarized in a second direction reverse to the first direction to be formed again into a substantially parallel light by the OL 107. Then, the light is deflected by the DP 106, passes through the ¼ wave plate 105a, and is linearly polarized to be perpendicular to its emission path. Thereafter, the light passes through the dichroic prism 104 to be reflected from the PBS 103. Then, the light is formed into a convergent light by the DL 109 and reaches the PD 110. An information signal and servo signals including a tracking-servo signal and a focus-servo signal are detected from the PD 110. The PD 110 is a multi-divided light-receiving element whose light-receiving surface is properly divided into a plurality of light-receiving parts according to a servo signal generation method employed by the PD 110.

Next, a description will be given of the CD optical system of the optical pickup unit of FIG. 3. For CD recording and/or reproduction, the optical pickup unit of FIG. 3 employs the HOE unit 201 formed by providing the LD chip 2011 and the PD 2013 in the can to separate a bundle of rays by using the HOE 2012. In FIG. 3, a light (light beam) of a wavelength λ2 (for instance, 780 nm) emitted from the LD chip 2011 of the HOE unit 201 is coupled by the coupling lens 202 and reflected from the dichroic prism 104. Then, the light passes through the ¼ wave plate 105a to be circularly polarized in the first direction. Thereafter, the light has its light path deflected by the DP 106 by 90° and is incident on the OL 107 to be converged into a small spot on the optical recording medium 108. Information reproduction, recording, or erasure is performed by the spot. The light reflected back from the optical recording medium 108 is circularly polarized in the second direction reverse to the first direction to be formed again into a substantially parallel light by the OL 107. Then, the light is deflected by the DP 106, passes through the ¼ wave plate 105a, and is linearly polarized to be perpendicular to its emission path. Thereafter, the light is reflected from the dichroic prism 104 to be formed into a convergent light by the coupling lens 202. Then, the light is diffracted by the HOE 2012 toward the PD 2013 provided in the same can as the LD chip 2011 to be received by the PD 2013. An information signal and servo signals including a tracking-servo signal and a focus-servo signal are detected from the PD 2013. The HOE 2012 and the PD 2013 have their respective hologram surface and light-receiving surface divided properly according to a servo signal generation method employed by the PD 2013.

Next, a description will be given of the effective diameter of each of the OL 107, the ¼ wave plate 105a, and the dichroic prism 104.

The OL 107 is generally mounted on an actuator (an objective lens driving device) so as to move in focus and tracking directions. Therefore, by determining the effective diameters of the ¼ wave plate 105a and the dichroic prism 104 based on the effective diameter and the movement range of the OL 107, each component can be formed in a required and sufficient size. That is, the effective diameters φ1, φ2, and φ3 of the OL 107, the ¼ wave plate 105a, and the dichroic prism 104, respectively, are determined to satisfy:

$$\phi 1 < \phi 2 < \phi 3 \tag{1}$$

Further, since the effective diameter φ1 of the OL 107 is limited to the minimum size required to form the spot, the actuator itself can be reduced in size, thus securing its response characteristic with its weight reduction.

Next, a description will be given of a configuration of the ¼ wave plate 105a of this embodiment.

In the optical pickup unit of FIG. 3, in order for the ¼ wave plate 105a to convert both of the light of the wavelength of 660 nm (red) and the light of the wavelength of 780 nm (infrared) from a linearly polarized light to a circularly polarized light or from a circularly polarized light to a linearly polarized light, the ¼ wave plate 105a is required to be formed of a crystal that, at a thickness t, makes a phase difference between an ordinary ray having a refractive index "no" and an extraordinary ray having a refractive index "ne" one fourth of each of the wavelengths of 660 and 780 nm. In other words, letting refractive index differences (no−ne) between the ordinary and extraordinary rays for laser lights of the wavelengths of 660 and 780 nm be Δn1 and Δn2, respectively, a crystal that satisfies the following expressions (2) and (3) is to be selected:

$$\Delta n1 \times t = \{(2p+1)/4\} \times 660 \ (p=0, 1, \ldots) \tag{2}$$

$$\Delta n2 \times t = \{(2q+1)/4\} \times 780 \ (p=0, 1, \ldots) \tag{3}$$

By providing the ¼ wave plate 105a having the above-described characteristic, the emitted light from the HOE unit 201 and the reflected light from the optical recording medium 108 toward the HOE unit 201 may be polarized in respective directions perpendicular to each other at the time of CD recording or reproduction. By thus polarizing the emitted and reflected lights in the directions perpendicular to each other, noise generation by the returning light to the LD chip (semiconductor laser) 2011 can be avoided. Further, for the DVD optical system, a polarization splitting optical system is realized by combining the PBS 103 and the ¼ wave plate 105a, so that a sufficient amount of light can be obtained and noise generation by the returning light to the LD 101 can be reduced.

Further, by thus providing the ¼ wave plate 105a between the dichroic prism 104, which is a light-path combination part combining the lights of the wavelengths of 660 and 780 nm, and the OL 107, without additionally increasing the number of components, the amount of light can be secured and noise generation in the LD 101 can be avoided in the DVD optical system, and noise generation by the returning light to the LD chip 2011 can be avoided in the CD optical system, which is a non-polarization optical system.

Second Embodiment

An optical pickup unit according to a second embodiment of the present invention is equal in configuration to that of FIG. 3 except that the phase plate 105a provided between the dichroic prism 104 and the OL 107 functions as a ¼ wave plate only to the wavelength of 660 nm and has a phase difference with respect to the wavelength of 780 nm so as to control the level of noise generation by the returning light, or so as to prevent the level of noise generation from exceeding a predetermined allowable level, which is determined by using as measures the allowable widths of the servo signals and the information signal at the time of recording or reproduction.

A description will be given of the phase plate 105a of this embodiment. The phase plate 105a functions as a ¼ wave plate to the LD 101 of the wavelength of 660 nm (red) and is formed to convert a linearly polarized light to a circularly polarized light or a circularly polarized light to a linearly polarized light. That is, the phase plate 105a is required to be a ¼ wave plate formed of a crystal that, at a thickness t, makes a phase difference between an ordinary ray (refractive index "no") and an extraordinary ray (refractive index "ne") one fourth of the wavelength of 660 nm. Letting a refractive index difference (no−ne) between the ordinary and extraordinary rays of a laser beam of the wavelength of 660 nm be Δn1, the phase plate 105a is required to be formed of a crystal that satisfies the following expression (4):

$$\Delta n1 \times t = \{(2p+1)/4\} \times 660 \ (p=0, 1, \ldots) \tag{4}$$

Further, the phase plate 105a provides the linearly polarized light of the wavelength of 780 nm emitted from the LD chip 2011 of the CD optical system with any phase difference on each of its paths to and from the optical recording medium 108 so as to be elliptically polarized and return to the HOE unit 201. As a result, noise generation by the returning light to the LD chip 2011 in the HOE unit 201 is controlled.

By providing the phase plate 105a having the above-described characteristic, the light emitted from the LD chip 2011 in the HOE unit 201 of the CD optical system and the reflected light from the optical recording medium 108 toward the HOE unit 201 are polarized differently, so that noise generation by the returning light to the LD chip 2011 can be controlled. Further, for the DVD optical system, a polarization splitting optical system is realized by combining the PBS 103 and the ¼ wave plate (phase plate) 105a, so that a sufficient amount of light can be obtained and noise generation by the returning light to the LD 101 can be prevented.

Compared with a ¼ wave plate accommodating the two types of wavelengths of 660 and 780 nm as in the first embodiment, the cost of a phase plate can be lowered by, as in this embodiment, using the phase plate as a ¼ wave plate to the wavelength of 660 nm to realize polarization splitting thereof, but using the phase plate for the wavelength of 780 nm on the moderated condition of controlling the noise level.

Third Embodiment

Figure 4:
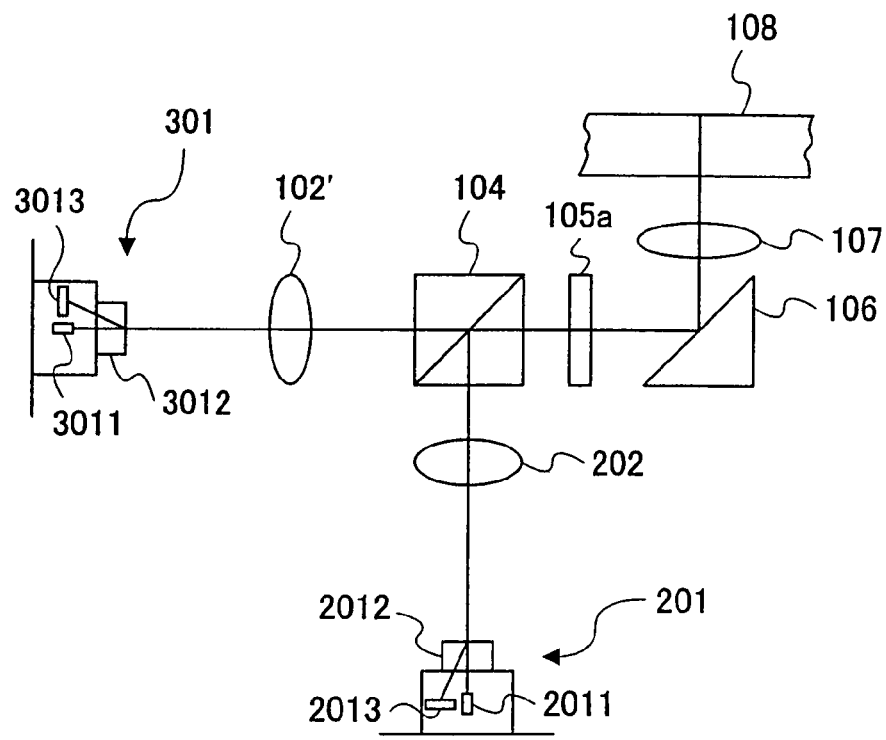
FIG. 4 is a schematic diagram showing a configuration of an optical pickup unit according to a third embodiment of the present invention.

FIG. 4 is a schematic diagram showing a configuration of an optical pickup unit according to a third embodiment of the present invention.

While a polarization optical system is employed for the DVD optical system and a non-polarization optical system is employed in the CD optical system in each of the first and second embodiments, the third embodiment differs therefrom in employing an HOE unit 301 also for the DVD optical system. Thereby, the non-polarization optical system is provided for each of the wavelengths of the DVD and CD optical systems. Since the configuration and the operation of the CD optical system of the optical pickup unit of FIG. 4 are equal to those of the optical pickup unit of FIG. 3, a description thereof will be omitted. Further, in FIG. 4, the same elements as those of FIG. 1 are referred to by the same numerals, and a description thereof will be omitted.

In FIG. 4, at the time of DVD recording or reproduction, a divergent light of the wavelength λ1 (for instance, 660 nm) emitted from a semiconductor laser (LD chip) 3011 of the HOE unit 301 is coupled by a coupling lens 102' to pass through the dichroic prism 104. Then, the light passes through the ¼ wave plate (phase plate) 105a accommodating the wavelengths of 660 and 780 nm according to the present invention to be circularly polarized in a first direction. Thereafter, the light has its light path (emission path) deflected by the DP 106 by 90° and is incident on the OL 107 to be converged into a small spot on the optical recording medium 108. Information reproduction, recording, or erasure is performed by the spot. The light reflected from the optical recording medium 108 is circularly polarized in a second direction reverse to the first direction to be formed again into a substantially parallel light by the OL 107. Then, the light is deflected by the DP 106, passes through the ¼ wave plate 105a, and is linearly polarized to be perpendicular to its emission path. Thereafter, the light passes through the dichroic prism 104 to be formed into a convergent light by the coupling lens 102'. Then, the light is diffracted by an HOE 3012 toward a light-receiving element (PD) 3013 provided in the same can as the LD chip 3011 to be received by the PD 3013. An information signal and servo signals including a tracking-servo signal and a focus-servo signal are detected from the PD 3013. The hologram surface of the HOE 3012 and the light-receiving surface of the PD 3013 are properly divided according to a servo signal generation method employed by the PD 3013. Further, the phase plate 105a of this embodiment has the same configuration and function as that of the first embodiment.

By employing the HOE unit for each of the CD and DVD optical systems as in the optical pickup unit of FIG. 4, the number of components, the number of assembly processes, and the size of the optical systems can be reduced compared with the optical systems of the first embodiment. In such an optical pickup unit composed of the non-polarization optical systems for both of the wavelengths of 660 and 780 nm, by employing the phase plate 105a functioning as a ¼ wave plate of each of the wavelengths, noise generation by the returning lights to the LD chip 3011 for the DVD optical system and the LD chip 2011 for the CD optical system can be avoided.

Fourth Embodiment

An optical pickup unit according to a fourth embodiment of the present invention employs a non-polarization optical system for each of the DVD and CD optical systems as the optical pickup unit of the third embodiment. The optical pickup unit of this embodiment is equal in configuration to that of FIG. 4 except that the phase plate 105a provided between the dichroic prism 104 and the OL 107 has a phase difference so that noise generation due to the returning light can be avoided with respect to each of the wavelengths of 660 and 780 nm. That is, the phase plate 105a has a phase difference so that, with respect to each of the wavelengths of 660 and 780 nm, the level of noise generation is prevented from exceeding a predetermined allowable level, which is determined by using as measures the allowable widths of the servo signals and the information signal at the time of recording or reproduction.

Here, a description will be given of a configuration of the phase plate 105a of this embodiment. The phase plate 105a provides a given phase difference to each of the lights of the wavelengths of 660 and 780 nm when the light passes through the phase plate 105a in its emission and reflection paths, that is, in a light path from the LD chip 3011 to the optical recording medium 108 and a light path back from the optical recording medium 108 to the PD 3013. Thereby, the lights are elliptically polarized to return to the HOE unit 301 of the DVD optical system and the HOE unit 201 of the CD optical system, respectively. As a result, in both DVD and CD optical systems, the lights emitted from the LD chips 3011 and 2011 in the respective HOE units 301 and 201 are polarized in different directions from those in which the lights reflected back from the optical recording medium 108 toward the HOE unit 301 and 201, respectively, are polarized. Thereby, noise generation can be controlled compared with a case in which emitted and reflected lights are polarized in the same direction (that is, a case where no phase plate is provided).

Compared with a ¼ wave plate accommodating the two types of wavelengths of 660 and 780 nm as in the third embodiment, the cost of a phase plate can be lowered by using the phase plate on the moderated condition of controlling the noise level as in this embodiment.

Fifth Embodiment

Next, a description will be given of a fifth embodiment of the present invention.

Figure 5:
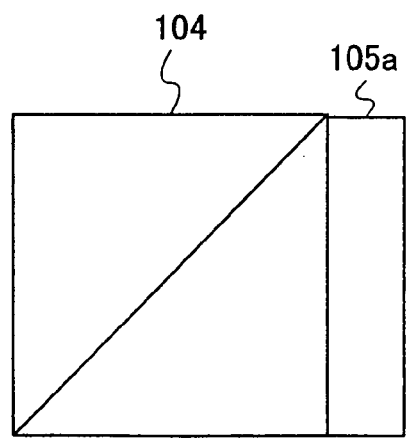
FIG. 5 is a schematic sectional view of an optical component into which a dichroic prism and a phase plate are integrated.

In each of the optical pickup units shown in FIGS. 3 and 4, the phase plate 105a is only provided between the dichroic prism 104 and the OL 107. However, the dichroic prism 104 and the phase plate 105a may be formed integrally by using an adhesive agent as an optical component shown in FIG. 5. Thereby, the optical pickup unit can be downsized, so that reduction in the number of components and consequent reduction in the number of assembly processes can be realized. Further, this also realizes reduction in the cost of the optical pickup unit.

Sixth Embodiment

Figure 6:
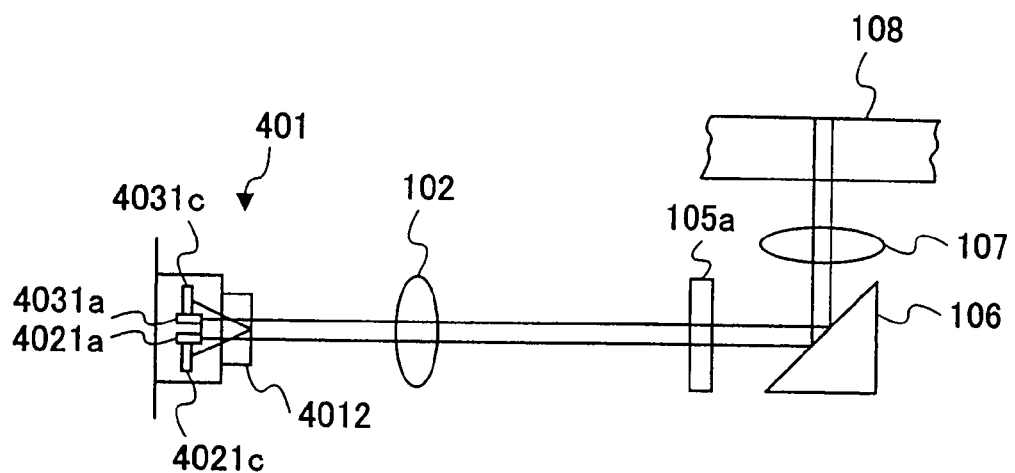
FIG. 6 is a schematic diagram showing a configuration of an optical pickup unit according to a sixth embodiment of the present invention.

FIG. 6 is a schematic diagram showing a configuration of an optical pickup unit according to a sixth embodiment of the present invention. The optical pickup unit of FIG. 6 employs an HOE unit 401.

The PBS 103 that is a polarization-type light-path splitting element is used for the DVD optical system and the HOE unit 201 that is a non-polarization-type light-path splitting element is used for the CD optical system in each of the first and second embodiments shown in FIG. 3, and the HOE units 201 and 301 that are non-polarization-type light-path splitting elements are used for both CD and DVD optical systems in each of the third and fourth embodiments shown in FIG. 4. On the other hand, the optical pickup unit of this embodiment employs a non-polarization-type HOE 4012 that functions as a light-path splitting element for each of the wavelengths of 660 and 780 nm instead of providing separate light-path splitting elements for the DVD and CD optical systems. In this respect, the optical pickup unit of this embodiment differs from those of the previous embodiments.

Figure 7:
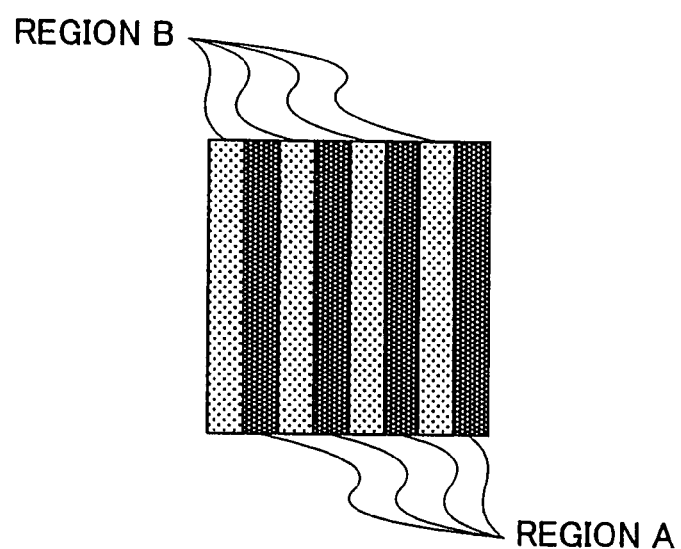
FIG. 7 is a diagram showing a configuration of an HOE of the optical pickup unit of FIG. 6.

The HOE 4012 accommodating the two wavelengths and provided in the optical pickup unit of the sixth embodiment is divided into regions A and B each divided into strip-like rectangular regions so that the rectangular regions of the regions A and the rectangular regions of the region B are arranged alternately as shown in FIG. 7. The HOE 4012 converges the light of the wavelength of 660 nm on a detection element for the DVD optical system by using the region A and converges the light of the wavelength of 780 nm on a detection element for the CD optical system by using the region B. Further, as shown in FIG. 6, an LD 4031a serving as a light source and a PD 4031c for the DVD optical system, an LD 4021a serving as a light source and a PD 4021c for the CD optical system, and the HOE 4012 are provided in a single package.

First, a description will be given of an operation of the DVD optical system. A linearly polarized divergent light emitted from the LD 4031a of the wavelength of 660 nm passes through the HOE 4012 to be formed into a substantially parallel light by the CL 102. Then, the light passes through the phase plate 105a accommodating the wavelengths of 660 and 780 nm to be circularly polarized in a first direction. Thereafter, the light has its light path (emission path) deflected by the DP 106 by 45° and is incident on the OL 107 to be converged into a small spot on the optical recording medium 108. Information reproduction, recording, or erasure is performed by the spot. The light reflected back from the optical recording medium 108 is circularly polarized in a second direction reverse to the first direction to be formed into a substantially parallel light by the OL 107. Then, the light is deflected by the DP 106, passes through the phase plate 105a, and is linearly polarized to be perpendicular to the emission path. Thereafter, the light is formed into a convergent light by the CL 102 and diffracted by the HOE 4012 to reach the PD 4031c. An information signal and servo signals are detected from the PD 4031c.

Likewise, the linearly polarized divergent light emitted from the LD 4021a of the wavelength of 780 nm for the CD optical system travels in the same path as the light emitted from the LD 4031a. The light is reflected from the optical recording medium 108 and diffracted in the region B of the HOE 4012 to be converged on the PD 4021c that is a light-receiving element for the CD optical system. The light-receiving surfaces of the PDs 4021c and 4031c and the regions A and B of the HOE 4012 are properly divided according to a servo-signal generation method employed by the PDs 4021c and 4031c. Further, the phase plate 105a of the sixth embodiment has the same configuration as that of the third embodiment.

According to the optical pickup unit having the above-described configuration of the sixth embodiment, the same light-path splitting element is used for both CD and DVD optical systems. Thereby, the number of components, the number of assembly processes, and the size of the optical systems can be reduced compared with the optical systems of the optical pickup unit of the first embodiment. Further, according to the optical pickup unit of the sixth embodiment, by providing the phase plate 105a serving as a ¼ wave plate, the light emitted from the LD 4031a can be linearly polarized in a direction perpendicular to a direction in which the light reflected back from the optical recording medium 108 toward the HOE 4012 is linearly polarized at the time of recording or reproduction. By thus linearly polarizing the emitted and reflected lights in the directions perpendicular to each other, noise generation by the returning light to the LD 4031a can be avoided. Likewise, by linearly polarizing the emitted and reflected lights in directions perpendicular to each other at the time of CD recording or reproduction, noise generation by the returning light to the LD 4021a can be prevented.

Seventh Embodiment

A description will be given of an optical pickup unit according to a seventh embodiment of the present invention.

The optical pickup unit of this embodiment is equal to that of the sixth embodiment in employing the non-polarization-type HOE 4012 accommodating the two wavelengths for the DVD and CD optical systems, but is different therefrom in that the phase plate 105a provided between the HOE 4012 and the OL 107 has a phase difference so that, with respect to each of the wavelengths of 660 and 780 nm, the level of noise generation by the returning light is prevented from exceeding a predetermined allowable level, which is determined by using as measures the allowable widths of the servo signals and the information signal at the time of recording or reproduction. Further, the phase plate 105a of this embodiment has the same configuration as that of the sixth embodiment.

According to the optical pickup unit of the seventh embodiment, cost potential can be secured by using the phase plate 105a that is to be employed on the condition of limiting the level of noise generation within the allowable range with respect to each of the wavelengths of 660 and 780 nm. Further, the phase plate 105a of this embodiment can be produced with lower costs than the phase plate 105a of the sixth embodiment that functions as a ¼ wave plate for both wavelengths of 660 and 780 nm.

Eighth Embodiment

In order to improve usability of light with respect to each of the DVD and CD optical systems, an optical pickup unit employs a broadband ¼ wave plate that can provided a phase difference of a ¼ wavelength (90°) to each of wavelengths of 650 and 780 nm. By providing the broadband ¼ wave plate with a reflection function and arranging the broadband ¼ wave plate under an objective lens, the broadband ¼ wave plate is caused to function as an upward reflection mirror as well. Thereby, an increase in a phase difference can be avoided even when a beam-shaping prism is employed to increase the number of reflection surfaces, thus preventing deterioration of a signal component. Further, since no transmission-type ¼ wave plate is provided under the objective lens as in the conventional optical pickup unit, the optical pickup unit can be reduced in thickness.

Figure 8:
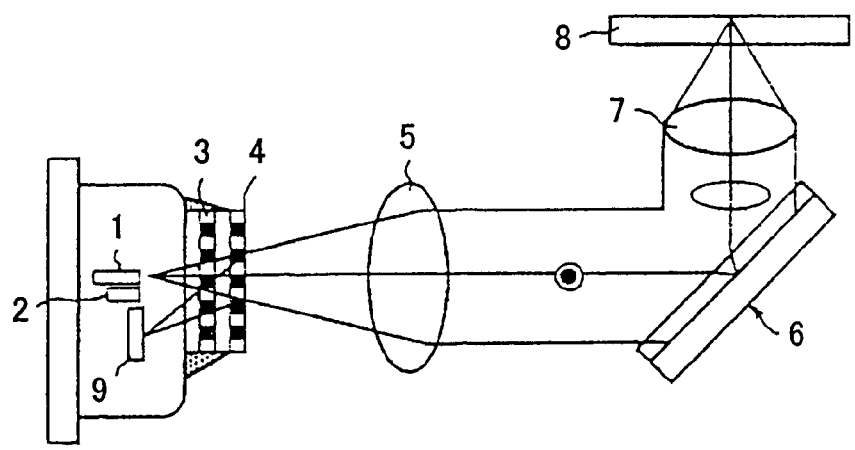
FIG. 8 is a schematic diagram showing a configuration of an optical pickup unit employing an optical element according to an eighth embodiment of the present invention.

FIG. 8 is a schematic diagram showing a configuration of an optical pickup unit employing an optical element according to an eighth embodiment of the present invention. Of two semiconductor lasers of 650 and 780 nm provided to the optical pickup unit, FIG. 8 illustrates the effect of a light emitted from the semiconductor laser of 650 nm. According to FIG. 8, the optical pickup unit of this embodiment includes a semiconductor laser (LD) 1 of 650 nm, a semiconductor laser (LD) 2 of 780 nm, a first hologram 3, a second hologram 4, a collimator lens (coupling lens) 5, an optical element 6, an objective lens 7, an optical recording medium 8, and a light-receiving element 9. The linearly polarized light emitted from the LD 1 of 650 nm that is a light source passes through the first and second holograms 3 and 4 in the order described to be formed into a parallel light by the collimator lens 5. Thereafter, the light is reflected from the optical element and converged by the effect of the objective lens on the optical recording medium 8.

The optical element 6 provides the incident linearly polarized light with the phase difference of the ¼ wavelength in total when the light passes through and is reflected from the optical element 6. Thereby, the light is circularly polarized and emitted therefrom to be converged on the optical recording medium 8. The light reflected from the optical recording medium 8 travels back in an optical path through which the light has traveled from the LD 1 to the optical recording medium 8. Then, the light is reflected again from the optical element 6 to be provided with the phase difference of the ¼ wavelength by the same effect. Thereby, the light is linearly polarized in a direction different by 90° from a direction in which the light emitted from the LD 1 is linearly polarized. Thereafter, the linearly polarized light is diffracted by the second hologram 4 to be received by the light-receiving element 9. The second hologram 4 is a polarization hologram that diffracts a light of 650 nm and has its diffraction efficiency varying depending on a direction in which the light is polarized.

Figure 9:
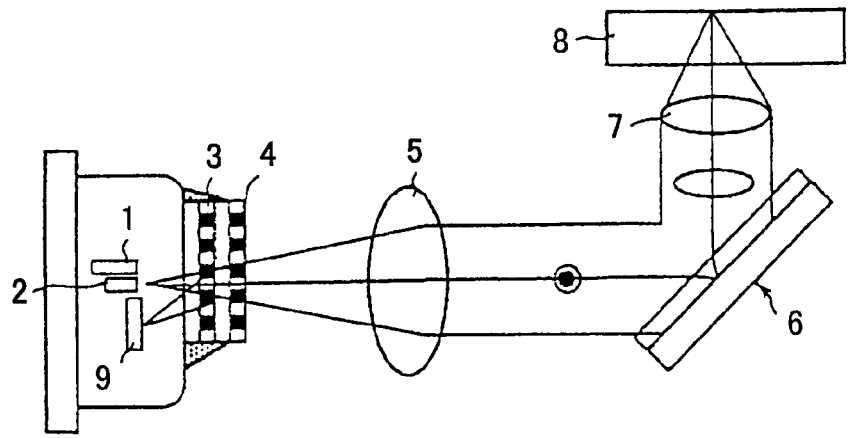
FIG. 9 is a schematic diagram of the optical pickup unit of FIG. 8 for illustrating an effect of a light emitted from an LD of 780 nm.

FIG. 9 is a schematic diagram of the optical pickup unit of this embodiment for illustrating the effect of a light emitted from the LD 2 of 780 nm. Like the light emitted from the LD 1 as shown in FIG. 8, the linearly polarized light emitted from the LD 2 passes through the first and second holograms 3 and 4 to be formed into a parallel light by the collimator lens 5. Then, the light is reflected from the optical element 6 and converged by the objective lens 7 on the optical recording medium 8. Since the optical element 6 provides the light with the phase difference of an approximately ¼ wavelength at the time of reflection of the light from the optical element 6, the reflected light is almost circularly polarized to be converged on the optical recording medium 8.

The light reflected from the optical recording medium 8 travels back in an optical path through which the light has traveled from the LD 2 to the optical recording medium 8. Then, the light is reflected again from the optical element 6, when the light is also provided with the phase difference of the ¼ wavelength to be linearly polarized in a direction different by 90° from a direction in which the light emitted from the LD 2 is linearly polarized. Thereafter, the linearly polarized light is diffracted by the first hologram 3 to be received by the light-receiving element 9. The first hologram 3 is a polarization hologram that diffracts a light of 780 nm and has its diffraction efficiency varying depending on a direction in which the light is polarized.

Figure 10:
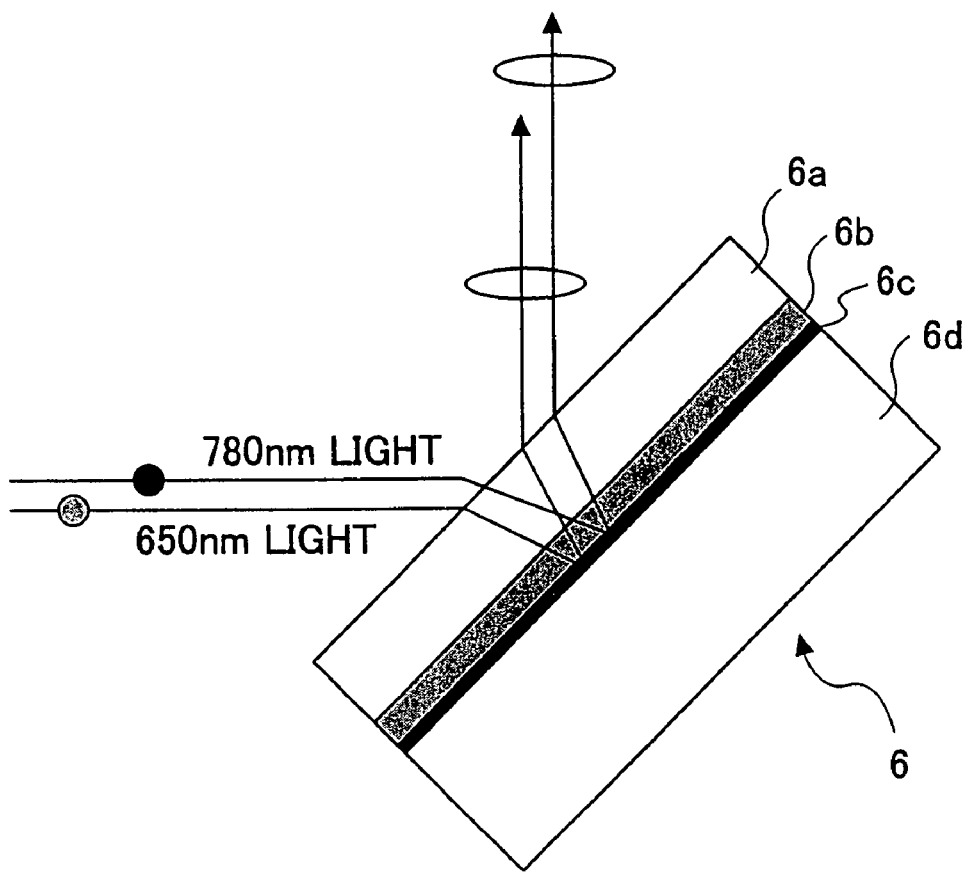
FIG. 10 is a diagram for illustrating a detailed configuration and an effect of the optical element.

FIG. 10 is a diagram for illustrating a detailed configuration and the effect of the optical element 6 according to this embodiment. In FIG. 10, the optical element 6 includes glass substrates 6a and 6d, a phase difference film 6b, and a total reflection film 6c. The phase difference film 6b functions as a broadband wave plate that provides each of a plurality of lights of specific wavelengths (the lights of 650 and 780 nm in this embodiment) with a phase difference as described above. The total reflection film 6c reflects the incident linearly polarized light so that at this point, the linearly polarized light passes through the phase difference film 6b twice to be provided with the ¼-wavelength phase difference, thereby being circularly polarized. The phase difference film 6b is formed of a plurality of organic films layered one over another for controlling wavelength dispersion.

As shown in FIG. 10, the phase difference film 6b and the total reflection film 6c are sandwiched by the glass substrates 6a and 6d, thereby forming the optical element 6. The linearly polarized light emitted from the LD 1 or 2 passes through the glass substrate 6a and the phase difference film 6b. At this point, the light is provided with a phase difference by the phase difference film 6b to be elliptically polarized. Next, the light is reflected from the total reflection film 6c to pass through the phase difference film 6b again. At this point, the light is again provided with a phase difference so as to have the total phase difference of the ¼ wavelength. Thereby, the light is substantially circularly polarized to be directed toward the optical recording medium 8. The phase difference film 6b is a broadband ¼ wave plate and provides the phase difference of the ¼ wavelength (90°) to each of the lights of the wavelengths of 650 and 780 nm. In the optical pickup unit having the above-described configuration, all of the elements provided in the light path except for the optical element 6 and the optical recording element 8 let through the linearly polarized light. Therefore, signal deterioration due to the phase difference can be minimized.

Figure 11:
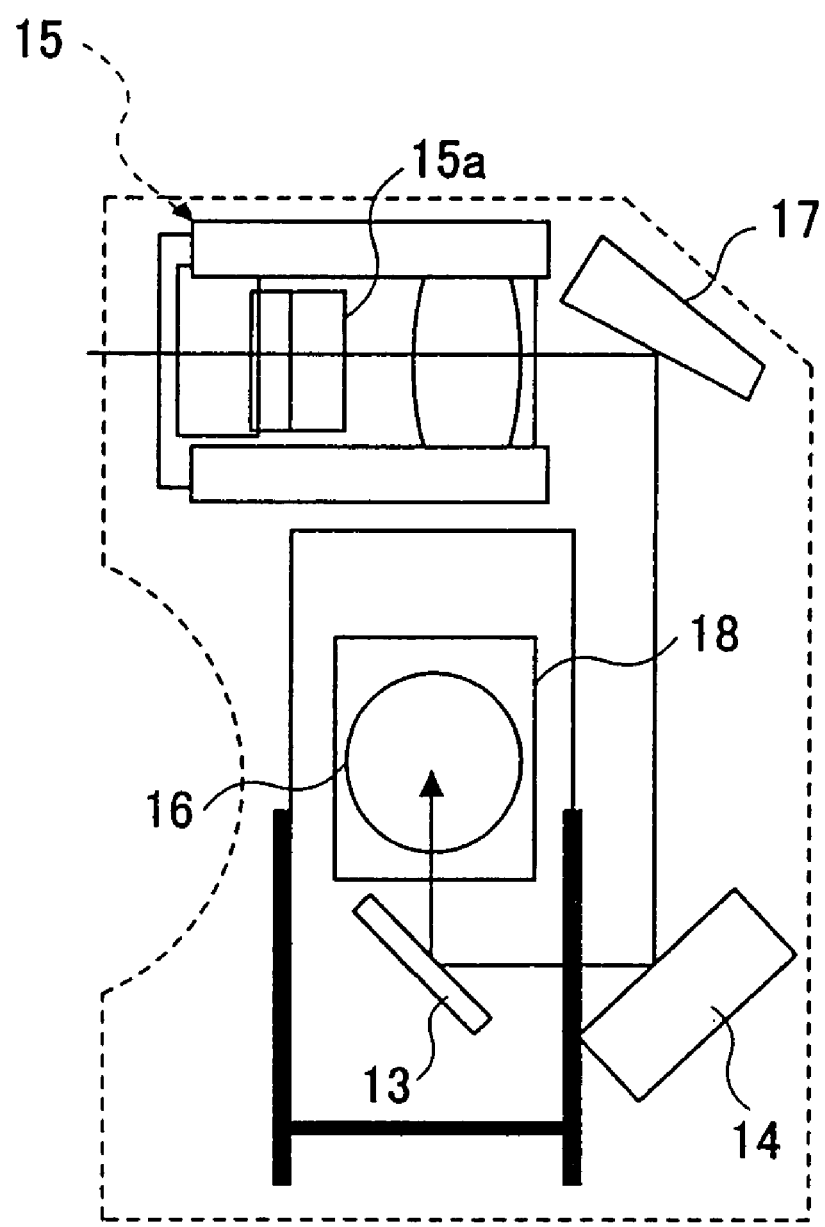
FIG. 11 is a diagram showing an optical system formed with the intention of downsizing an optical pickup unit by using, for instance, a beam-shaping prism.

FIG. 11 is a diagram showing an optical system formed with the intention of downsizing an optical pickup unit by using, for instance, a beam-shaping prism. The optical system of FIG. 11 includes a beam-shaping prism 17, an upward reflection mirror 18, a mirror-combined actuator 13, a reflection mirror 14, a hologram unit 15, a ¼ wave plate 15a, and an objective lens 16.

In FIG. 11, a linearly polarized light emitted from a light source (not shown in the drawing) is converted to a circularly polarized light by the ¼ wave plate 15a provided in the hologram unit 15. Then, the light is reflected by the beam-shaping prism 17, the reflection mirror 14, the mirror of the mirror-combined actuator 13, and the upward reflection mirror 18 to be incident on the objective lens 16. Thereby, the light is converged on a disk. The light reflected back from the disk travels back in a light path through which the light is incident on the objective lens 16 to the ¼ wave plate 15a. During this period, the circularly polarized light is reflected from the four reflection surfaces (eight reflection surfaces in total when the reflection surfaces are counted separately in the light path to the disk and the light path back from the disk). Therefore, usability of light decreases unless proper management is performed so that no phase deviation is caused in the light on any of the four reflection surfaces.

In order to avoid a phase deviation in any of the lights of the DVD and CD wavelengths as previously described, it is required to provide a multilayer coating of approximately 30 layers or more on each of the four reflection surfaces shown in FIG. 11. Such multilayer coating is required to secure high reflectivity with respect to the lights of the two wavelengths and cause no phase difference in any of the lights of the two wavelengths. This problem is characteristic of an optical pickup unit including two light sources of different wavelengths. Further, even if each phase deviation can be reduced by a multilayer coating, slight phase deviations may sum up to cause a great overall variation in the phase of each light since the four reflection surfaces require multilayer coatings.

According to the present invention, the ¼ wave plate 15a is not provided in the hologram unit 15, but the upward reflection mirror 18 is provided with the function of a ¼ wave plate. Thereby, the beam-shaping prism 17, the upward reflection mirror 18, and the mirror of the mirror-combined actuator 13 reflect the linearly polarized light of each of the two wavelengths, therefore dispensing with multilayer coatings of approximately 30 layers or more, which can be replaced by normal metal film coatings. This leads to cost reduction.

By employing an optical element that is used both as an upward reflection mirror and a broadband ¼ wave plate that provides the phase difference of the ¼ wavelength to each of the lights of the wavelengths of 650 and 780 nm as described above, high usability of light can be obtained, a phase variation can be reduced, and no costly reflection film of multilayer coating is required with respect to each of the lights of the two wavelengths. Further, since the optical element has a reflection function, the optical element simply replaces the conventional upward reflection mirror without changing the height of an optical pickup unit in which the optical element is employed. Therefore, this optical element has a configuration suitable for a downsized optical pickup unit.

That is, since the optical pickup unit according to this embodiment is capable of providing the phase difference of approximately 90° to each of the lights of the two wavelengths by the broadband ¼ wave plate, usability of light can be improved with respect to each of the lights of the two wavelengths. Therefore, the optical pickup unit according to this embodiment is suitably used as a multiwrite pickup. Further, the optical element 6 that provides the phase difference to the linearly polarized light so as to circularly polarize the linearly polarized light is provided right before the objective lens 7 in the light path. Therefore, even if pickup components include reflection surfaces, the reflection surfaces reflect the linearly polarized light. Accordingly, there is no need to form a multilayer film on each of the reflection surfaces for phase maintenance, thus realizing a cost reduction of the optical pickup unit.

Figure 12A:
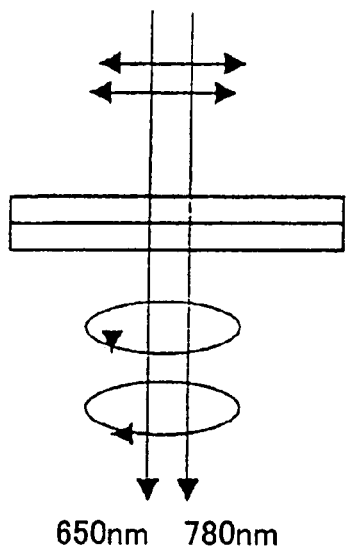
FIGS. 12A and 12B are diagrams for illustrating a function of a ¼ wave plate employed as an optical element of the eighth embodiment.
Figure 12B:
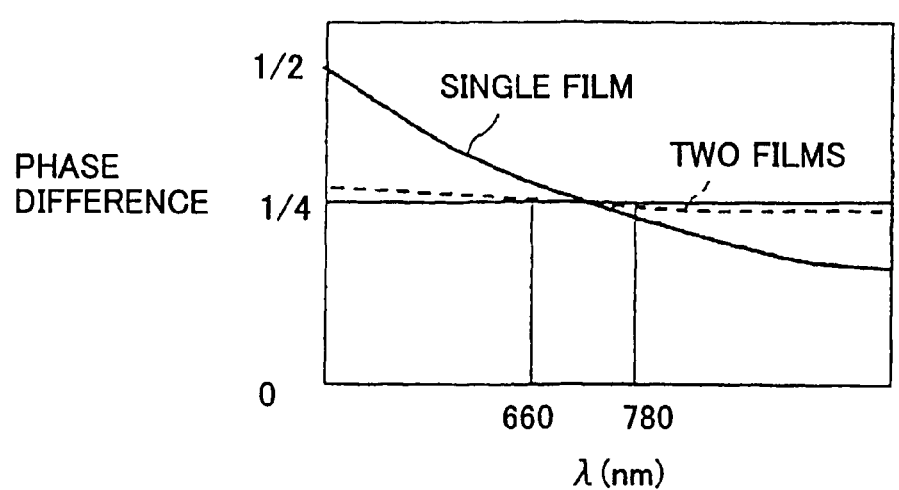

Next, a description will be given specifically of a multilayer phase difference film that functions as a broadband ¼ wave plate as described above. FIGS. 12A and 12B are diagrams for illustrating a function of the ¼ wave plate employed as the optical element of this embodiment. FIG. 12A is for illustrating the polarization conversion function of the ¼ wave plate and FIG. 12B is for illustrating the wavelength dispersion of the ¼ wave plate.

As previously described, the broadband wave plate that provides the phase difference of the ¼ wavelength (9020) to each of the lights of the wavelengths of 650 and 780 nm is employed in this embodiment. In order to provide the phase difference of the ¼ wavelength (90°) to each of the lights of both wavelengths at the same time, wavelength dispersion is required to be reduced in the ¼ wave plate. For this purpose, the ¼ wave plate is required to be formed of a plurality of phase difference films layered one over another so as to cancel the color dispersion of each phase difference film.

The broadband ¼ wave plate of the present invention is formed of a plurality of organic films layered one over another to control wavelength dispersion. That is, as shown in FIG. 12A, polarization conversion is performed on the lights of the wavelengths of 650 and 780 nm by layering two organic films one over the other, for instance. At this point, wavelength dispersion is made uniform by layering the two organic films as indicated by a broken line in FIG. 12B compared with wavelength dispersion in the case of a single organic film indicated by a solid line in FIG. 12B. An inexpensive organic material such as polycarbonate, polyvinyl alcohol, or polymethyl methacrylate can be employed as such an organic film, thereby realizing cost reduction.

Further, the advent of a blue-laser optical disk of higher density is expected in the future. In such a case, it is required to provide the phase difference of the ¼ wavelength to each of lights of three wavelengths $\lambda 1$, $\lambda 2$, and $\lambda 3$ ($\lambda 1 < \lambda 2 < \lambda 3$) at the same time. The broadband wave plate of this case is required to have a wavelength dispersion characteristic so that the lights of the three wavelengths are provided with the same phase difference. Therefore, it is necessary to provide the phase difference of the ¼ wavelength to each of the lights of the three wavelengths by combining a plurality of films of an organic material such as polyvinyl alcohol or polycarbonate.

Figure 13A:
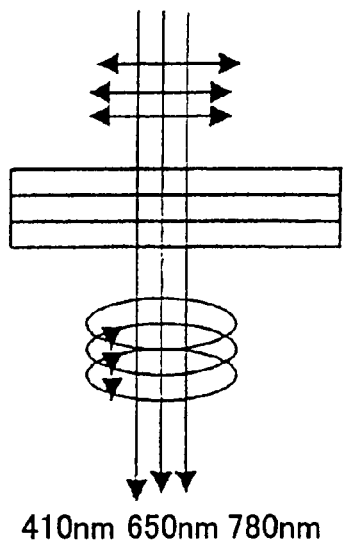
FIGS. 13A and 13B are diagrams for illustrating another function of the ¼ wave plate according to the present invention.
Figure 13B:
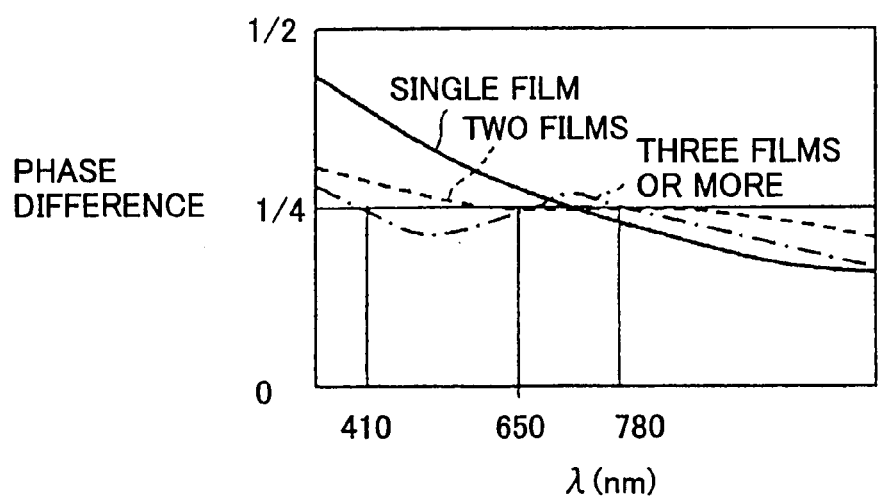

FIGS. 13A and 13B are diagrams for illustrating another function of the ¼ wave plate according to the present invention. FIG. 13A is for illustrating the polarization conversion function of the ¼ wave plate of a three-layer structure and FIG. 13B is for illustrating the wavelength dispersion thereof. As shown in FIG. 13A, polarization conversion is performed on lights of wavelengths of 410, 650, and 780 nm, for instance by layering three organic films one over the other. At this point, as indicated by a dot-dash line in FIG. 13B, wavelength dispersion can be controlled to a lower level with respect to each of the wavelengths by layering the three organic films one over the other. That is, as shown in FIG. 13B, the phase difference of the ¼ wavelength is not necessarily required to be maintained over the entire wavelength region from $\lambda 1$ to $\lambda 3$, but is required only for the discrete wavelengths of $\lambda 1$, $\lambda 2$, and $\lambda 3$.

As described above, according to the present invention, the broadband ¼ wave plate can be realized inexpensively by layering a plurality of organic films one over another to reduce wavelength dispersion. This serves to reduce the cost of the optical pickup unit.

Ninth Embodiment

In the eighth embodiment, the phase difference of the ¼ wavelength is provided to each of the lights of the two or three wavelengths by the broadband ¼ wave plate so that high usability of light can be obtained with respect to the light of each wavelength. On the other hand, in an optical pickup unit of this embodiment, only a light of a wavelength for DVD recording or reproduction, for instance, is provided with the phase difference of the ¼ wavelength to be circularly polarized so that usability of light can be improved, and a light of a wavelength for CD recording or reproduction is provided with a phase difference other than the ¼ wavelength to be elliptically polarized. Although usability of light is not as high in the CD optical system as in the DVD optical system, the CD optical system is designed to be able to employ the conventional hologram unit so that the cost of the optical pickup unit of this embodiment can be reduced.

Generally, in LD development, it is difficult to increase the power of an LD of a short wavelength. Therefore, when there are lights of the two wavelengths $\lambda 1$ and $\lambda 2$ ($\lambda 1 < \lambda 2$) as described above, it is often required to improve the usability of the light of the shorter wavelength $\lambda 1$. Therefore, in this embodiment, the phase difference of the ¼ wavelength is not provided to both lights of the two wavelength. Instead, the phase difference of the ¼ wavelength is provided only to the light of one of the wavelengths (especially, to the light of the shorter wavelength) and a phase difference other than the ¼ wavelength is provided to the light of the other wavelength.

Figure 14:
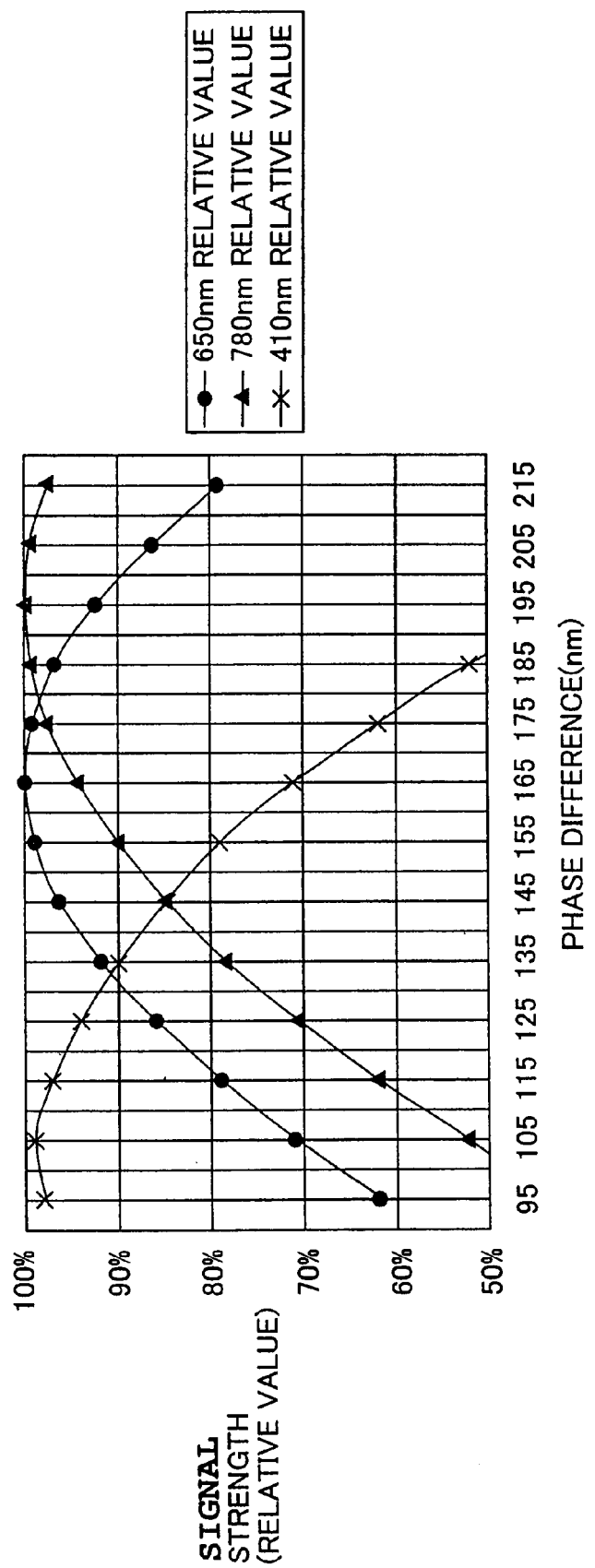
FIG. 14 is a graph showing a relationship between a phase difference and a signal strength.

FIG. 14 is a graph showing a relationship between phase difference and signal strength. When the phase difference of the ¼ wavelength (90°) is provided to a light of the wavelength of 650 nm, for instance, the light of the wavelength of 650 nm is circularly polarized so that high usability of light can be obtained. At this point, the above-described phase difference of 162.5 (=650/4) nm corresponds to a phase difference of 75° in the case of the wavelength of 780 nm (162.5/780×360=75). Therefore, as shown in FIG. 14, a signal strength of approximately 92% is obtained so that usability of light decreases by approximately 8% from that in the case of the phase difference of 90°.

According to the above-described method, usability of light decreases by approximately 8% with respect to the light of the one of the wavelengths (the light of the longer wavelength). However, considering that an LD for the light of the longer wavelength itself is high-powered and that the sensitivity of a light-receiving element for the light of the longer wavelength itself generates a higher output, the above-described method may be able to satisfy the specifications of a drive unit of a two-wavelength-recording type sufficiently. Further, since a normal (non-broadband) wave plate can be employed as a wave plate, cost reduction can be realized.

In the case of applying the method according to this embodiment to three wavelengths, the same effects as described above in the case of the two wavelengths can be produced. For instance, in a three-wavelength-compliant optical disk drive unit, letting the three wavelengths $\lambda 1$, $\lambda 2$, and $\lambda 3$ ($\lambda 1 < \lambda 2 < \lambda 3$) be 410, 650, and 780 nm, respectively, the ¼ wave plate is only required to provide the phase difference of the ¼ wavelength to a light of the shortest wavelength λ1 (410 nm) since an LD of λ1 (410 nm) is less high-powered at present than LDs of λ2 and λ3.

The ¼ wavelength of 410 nm, which is 102.5 nm, corresponds to a phase difference of 57° in the case of λ2 (650 nm) and may reduce the usability of light of λ2 to 80% or less. However, the light of λ2 is sufficient for reproduction use with its usability being at this level. If a decrease in the usability of light of λ2 is not desirable, it is effective to employ the broadband ¼ wave plate as shown in the eighth embodiment.

Further, the ¼ wavelength of 410 nm (102.5 nm) corresponds to a phase difference of 47° in the case of λ3 (7.80 nm) and reduces the usability of light thereof to 60% or less as shown in FIG. 14. However, the light of λ3 is sufficient for reproduction use with its usability being at this level. Further, since the LD of 780 nm has progressed in terms of power output so that the absolute power of the LD can be secured even with a low usability of light. Therefore, a light power of the LD of 780 nm of a sufficient level for recording can be obtained by slightly decreasing the recording rate.

According to this embodiment, the phase difference of the ¼ wavelength is provided only to the light of the DVD wavelength of an insufficient LD output, and a phase difference slightly deviated from the ¼ wavelength is made applicable to the light of the CD wavelength with the conventional component being employable in the CD optical system. Thereby, the usability of light of the DVD optical system is improved, and cost reduction is realized in the optical pickup unit according to this embodiment.

Tenth Embodiment

In the eighth and ninth embodiments, the phase difference of the ¼ wavelength or a given phase difference is provided to each of the wavelengths corresponding to CDs and DVDs on the assumption that recording or reproduction is performed on both CDs and DVDs. However, if an LD light source has a sufficient emission power, a sufficient recording power can be secured on the optical recording medium 8 without employing an isolator configuration using a polarization hologram and a ¼ wave plate. In this case, a normal non-polarization hologram can replace the polarization hologram, thus serving for cost reduction. That is, in this embodiment, the phase difference of the ¼ wavelength is provided only to a light of the DVD wavelength so as to improve usability of light, while no phase difference is provided to a light of the CD wavelength with the conventional hologram unit being employable in the CD optical system, thereby realizing cost reduction although usability of light is not as high in the CD optical system as in the DVD optical system.

At present, the LD of 780 nm for CD recording or reproduction has progressed considerably in terms of power output to have sufficient power, while the LD of 650 nm for DVD recording or reproduction has been relatively less developed in terms of power output, thus failing to obtain sufficient power. Therefore, it is often the case that the CD optical system employs a non-polarization hologram and the DVD optical system has a isolator configuration using a ¼ wave plate. In order to be compatible with such a configuration, the optical element of the present invention may have a configuration shown in FIG. 15.

Figure 15:
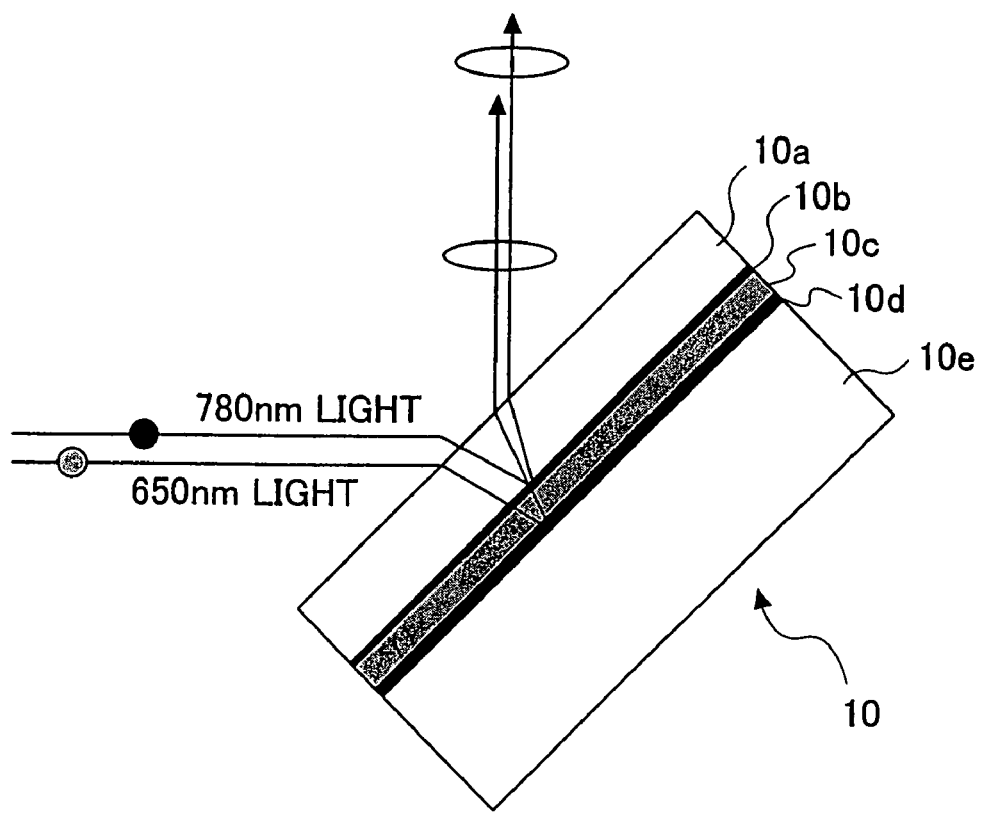
FIG. 15 is a diagram showing an optical element according to a tenth embodiment of the present invention.

FIG. 15 is a diagram showing an optical element 10 according to a tenth embodiment of the present invention. The optical element 10 includes a glass substrate 10a, a wavelength selection film 10b, a phase difference film 10c, a total reflection film 10d, and a glass substrate 10e. The optical element 10 of this embodiment has a configuration that the wavelength selection film 10b is added between the glass substrate 6a and the phase difference film 6b of the optical element 6 of FIG. 10. That is, the optical element 10 of this embodiment has the wavelength selection film 10b, the phase difference film 10c, and the total reflection film 10d provided in the order described from the incidence side between the glass substrates 10a and 10e.

A light of the wavelength of 780 nm emitted from the light source passes through the glass substrate 10a and is reflected from the wavelength selection film 10b toward the surface of the optical recording medium 8. On the other hand, a light of the wavelength of 650 nm emitted from the light source passes through the glass substrate 10a, the wavelength selection film 10b, and further, the phase difference film 10c. Then, the incident linearly polarized light of 650 nm is provided with a phase difference by the phase difference film 10c to be elliptically polarized, and is reflected from the total reflection film 10d to pass through the phase difference film 10c again. At this point, the light is further provided with a phase difference so as to have the phase difference of the ¼ wavelength in total. Thereby, the light is substantially circularly polarized. The circularly polarized light passes through the wavelength selection film 10b to be directed toward the optical recording medium 8.

According to the configuration of this embodiment, the light of the wavelength of 650 nm can be provided with the phase difference of the ¼ wavelength, thereby improving its usability. On the other hand, since the light of the wavelength of 780 nm is provided with no phase difference, its usability is not improved. However, a non-polarization hologram may be employed for the light of the wavelength of 780 nm, thereby realizing cost reduction.

In this embodiment, the optical isolator configuration is applied to only one of the lights of the two wavelengths so that the one of the lights is provided with the phase difference of the ¼ wavelength and no polarization is used for the other one of the lights. Thereby, the conventional component may be employed in the optical pickup unit to reduce the cost thereof. The configuration according to this embodiment is applicable not only to the above-described two-wavelength optical element 10 but also to an optical element accommodating three wavelengths or more. In this case, the multiple-wavelength optical element may be used so as to circularly polarize one or some of lights of a plurality of wavelengths (especially, a light or lights on the shorter-wavelength side) by providing the phase difference of the ¼ wavelength thereto and reflect the rest of the lights by the wavelength selection film.

11th Embodiment

Figure 16:
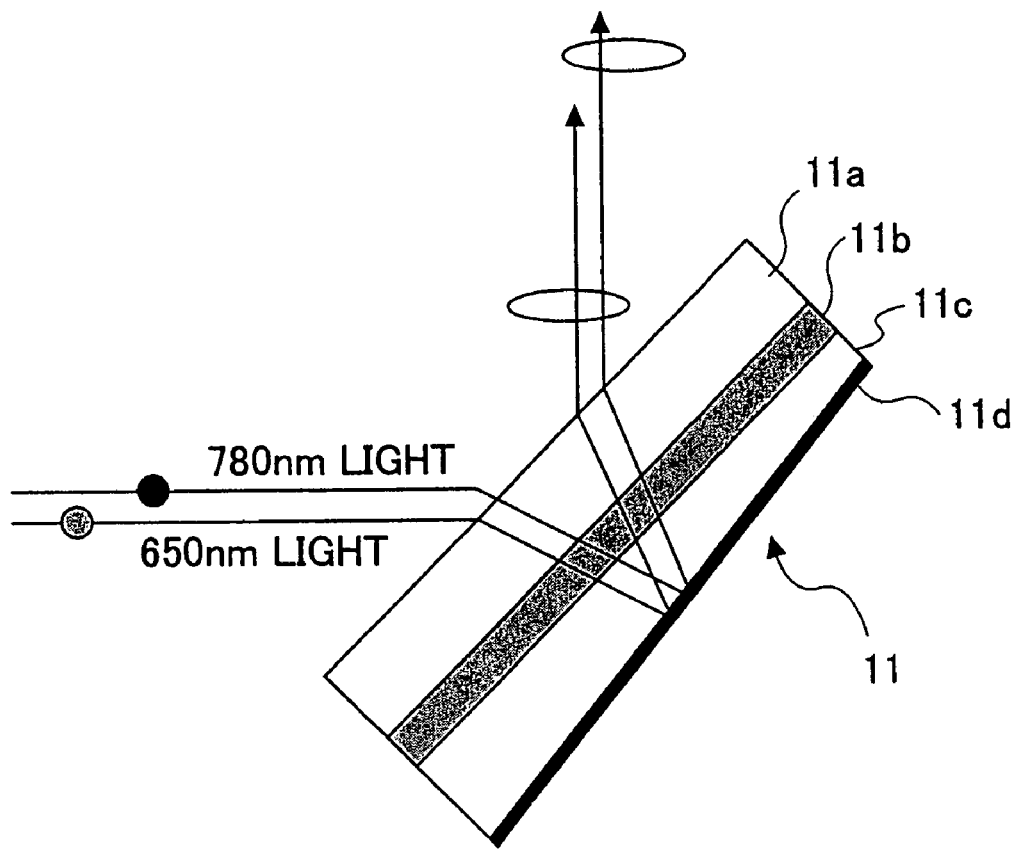
FIG. 16 is a diagram showing an optical element according to an 11th embodiment of the present invention.

An optical element according to this embodiment has a configuration that a beam-shaping function is added to the optical element 6 of the eighth embodiment. That is, a two-wavelength ¼ wave plate and a two-wavelength beam-shaping prism are integrated to improve usability of light in each of the DVD and CD optical systems. FIG. 16 is a diagram showing an optical element 11 according to this embodiment. The optical element 11 includes a beam-shaping function in addition to the configuration of the optical element 6 of the eighth embodiment. The optical element 11 includes a glass substrate 11a, a phase difference film 11b, a prism 11c, and a total reflection film 11d.

Since the configuration shown in FIG. 8 or 9 is applicable to the entire optical pickup unit of this embodiment, a description will be given only of light movements in the optical element 11. Linearly polarized lights of 650 and 780 nm emitted from the light sources (the LD 1 of 650 nm and the LD 2 of 780 nm) pass through the glass substrate 11a and the phase difference film 11b. The incident linearly polarized lights are provided with a phase difference by the phase difference film 11b to be elliptically polarized. Then, the elliptically polarized lights pass through the prism 11c and are reflected from the total reflection film 11d to pass through the phase difference film 11b again. The reflected lights are further provided with a phase difference by the phase difference film 11b to be substantially circularly polarized, and are directed toward the optical recording medium 8 shown in FIG. 8.

The configuration of this embodiment is equal to that of the eighth embodiment in that the phase difference of the approximately ¼ wavelength is provided to each of the incident lights. In this embodiment, however, each of the elliptically-shaped incident beams is shaped to be enlarged in its minor-axis direction. Thereby, an increased amount of light can be projected onto the surface of the optical recording medium 8 due to the isolator configuration using the ¼ wave plate, and further, usability of light can be improved. Since a larger amount of light can be projected onto the surface of the optical recording medium 8, recording can be performed at a higher rate.

Figure 17:
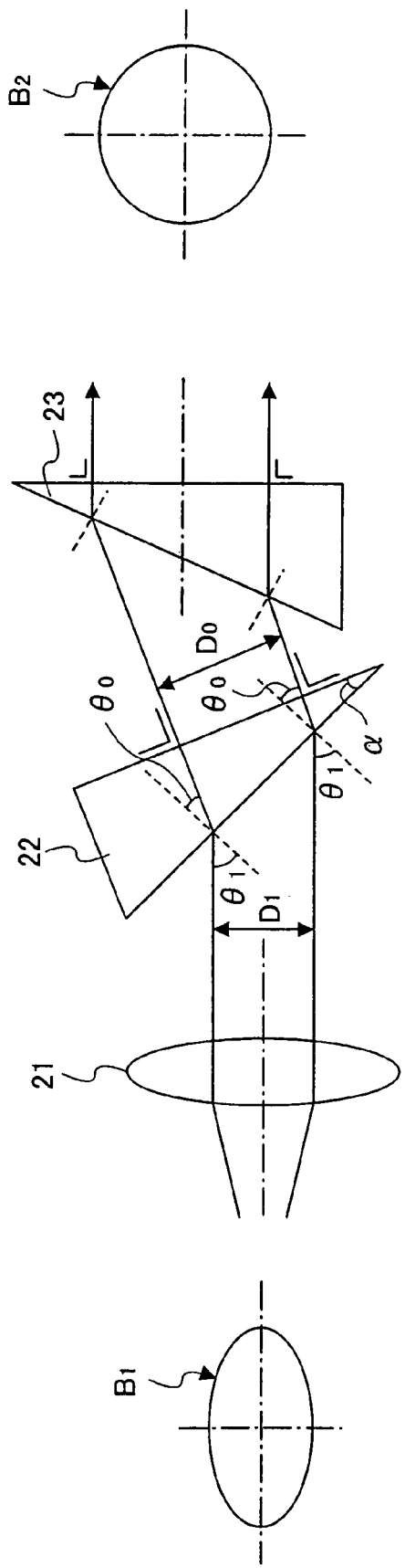
FIG. 17 is a diagram for illustrating a beam shaping function applied to the present invention.

FIG. 17 is a diagram for illustrating the above-described beam shaping. In order to improve usability of light as much as possible in an optical pickup unit, especially, of a recording type, a collimator lens is provided in proximity to a laser light source or a collimator lens with a large numerical aperture (NA) is employed. In this case, however, an elliptically shaped beam is emitted from the collimator lens so as to be converged into an elliptical spot on an optical recording medium by an objective lens. Therefore, beam shaping is required to shape the elliptical beam emitted from the collimator lens into a circular beam.

That is, as shown in FIG. 17, an elliptical beam $B_1$ emitted from a collimator lens 21 can be shaped into a circular beam $B_2$ of isotropic intensity distribution by using an optical system such as a prism. In FIG. 17, first and second triangular prisms 22 and 23 are provided in the light path of the beam $B_1$ emitted from a collimator lens 21 to perform beam shaping. Here, the two prisms 22 and 23 are employed to emit a bundle of rays in the same direction as that of an incident bundle of rays, while beam shaping is performable by a single prism as shown in this embodiment.

In the first prism 22, letting an angle of incidence, an angle of refraction, an incident-beam diameter, and an emitted-beam diameter be $\theta_1$, $\theta_0$, $D_1$, and $D_0$, respectively, the following expression holds:

$$D_p = D_1/\sin(90-\theta_1) = D_0/\sin(90-\theta_0)$$

Thereby, $$D_0/D_1 = \cos\theta_0/\cos\theta_1 \quad (5)$$

Further, letting the index of refraction of the prism 22 be n, a relationship between $\theta_1$ and $\theta_0$ is given by $\sin\theta_1 = n\sin\theta_0$ according to Snell's law. At this point, letting an apex angle of the prism 22 be α, the above-described expression (5) is:

$$D_0/D_1 = \cos\alpha/(1-n^2\sin^2\alpha)^{1/2} \quad (6)$$

By designing and arranging the prism 22 in consideration of the expression (6), a beam-shaping optical system can be formed. Such a beam-shaping optical system can be realized by a combination of cylindrical lenses, but is formed more easily by employing prisms.

By performing beam shaping on each of the lights of both DVD and CD wavelengths by employing an optical element having the above-described beam-shaping function, the usability of each of the lights is improved so that a multiwrite optical pickup supporting high-speed recording can be realized. It is apparent that the configuration of FIG. 16 is also applicable to a configuration formed by adding the beam-shaping function to the optical pickup unit of the ninth embodiment.

12th Embodiment

Figure 18:
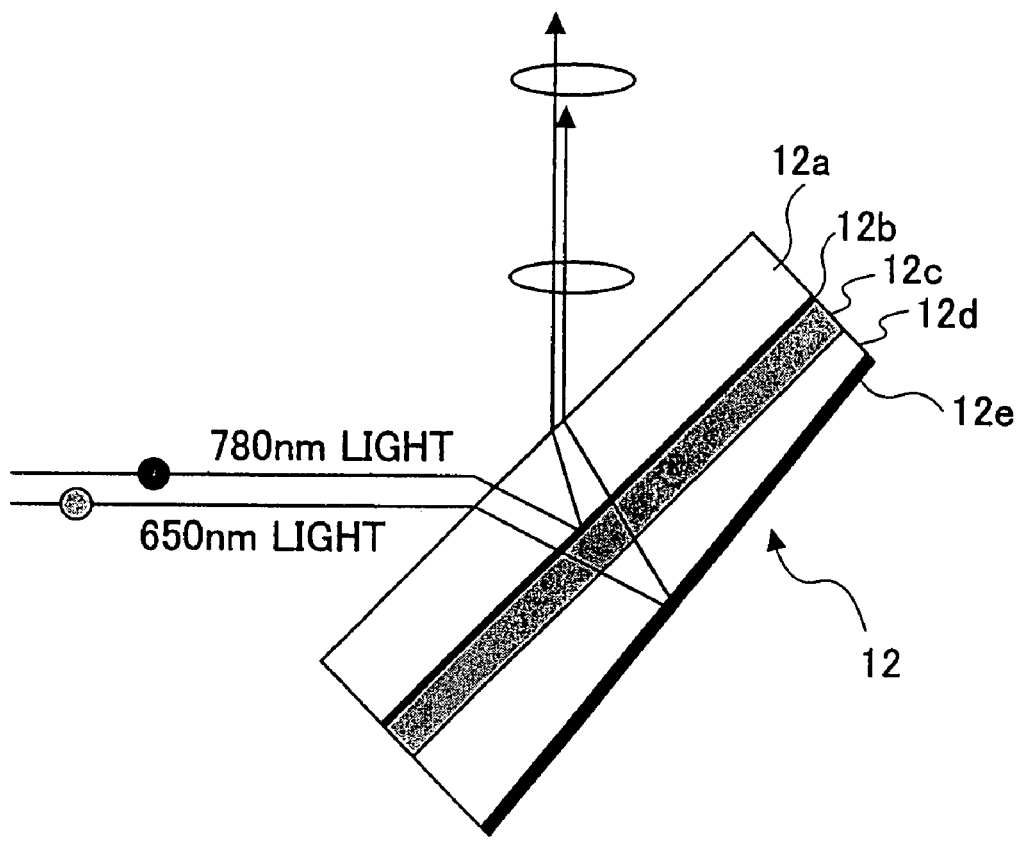
FIG. 18 is a diagram showing an optical element according to a 12th embodiment of the present invention.

Like in the 11th embodiment, a description will be given of an optical element with the beam-shaping function in this embodiment.. An optical element according to this embodiment has a configuration formed by adding the beam-shaping function to the configuration of the tenth embodiment. FIG. 18 is a diagram showing an optical element 12 according to this embodiment. The optical element 12 includes a glass substrate 12a, a wavelength selection film 12b, a phase difference film 12c, an edge prism 12d, and a total reflection film 12e. In the tenth embodiment, the description is given of the case where the optical isolator configuration is formed for the light of the specific wavelength lacking in sufficient LD power so that the phase difference of the ¼ wavelength is provided thereto, and no isolator configuration is provided for the light of the wavelength of sufficient LD power. In this embodiment, the beam-shaping function is further added to the above-described configuration.

That is, in this embodiment, beam shaping is performed only on a light of a wavelength lacking in sufficient LD power so as to improve its usability. The optical element 12 of FIG. 18 is formed by replacing the glass substrate 10e of FIG. 15 by the edge prism 12d

A light of the wavelength of 780 nm emitted from the light source (the LD 2 of 780 nm of FIG. 8) passes through the glass substrate 12a to be reflected from the wavelength selection film 12b toward the surface of the optical recording medium 8. On the other hand, a light of the wavelength of 650 nm emitted from the light source (the LD 1 of 650 nm of FIG. 8) passes through the glass substrate 12a, the wavelength selection film 12b, and further, the phase difference film 12c. Then, the light of 650 nm is provided with a phase difference by the phase difference film 12c to be elliptically polarized, and passes through the edge prism 12d to be reflected from the total reflection film 12e. Thereafter, the light of 650 nm again passes through the phase difference film 12c to be further provided with a phase difference. Thereby, the light of 650 nm is substantially circularly polarized. Then, the light of 650 nm passes through the wavelength selection film 12b to be directed toward the optical recording medium 8 of FIG. 8. The edge prism 12d performs beam shaping. Since the beam-shaping function has been described in the 11th embodiment, a description thereof will be omitted herein.

According to the above-described configuration of this embodiment, only the light of 650 nm can be provided with the phase difference of the ¼ wavelength and be subjected to beam shaping, thereby further improving its usability. Since no phase difference is provided to the light of 780 nm, its usability is not improved. However, the CD optical system is formed to employ a non-polarization hologram so that the conventional component may be used therefor, thus realizing cost reduction.

13th Embodiment

Figure 19:
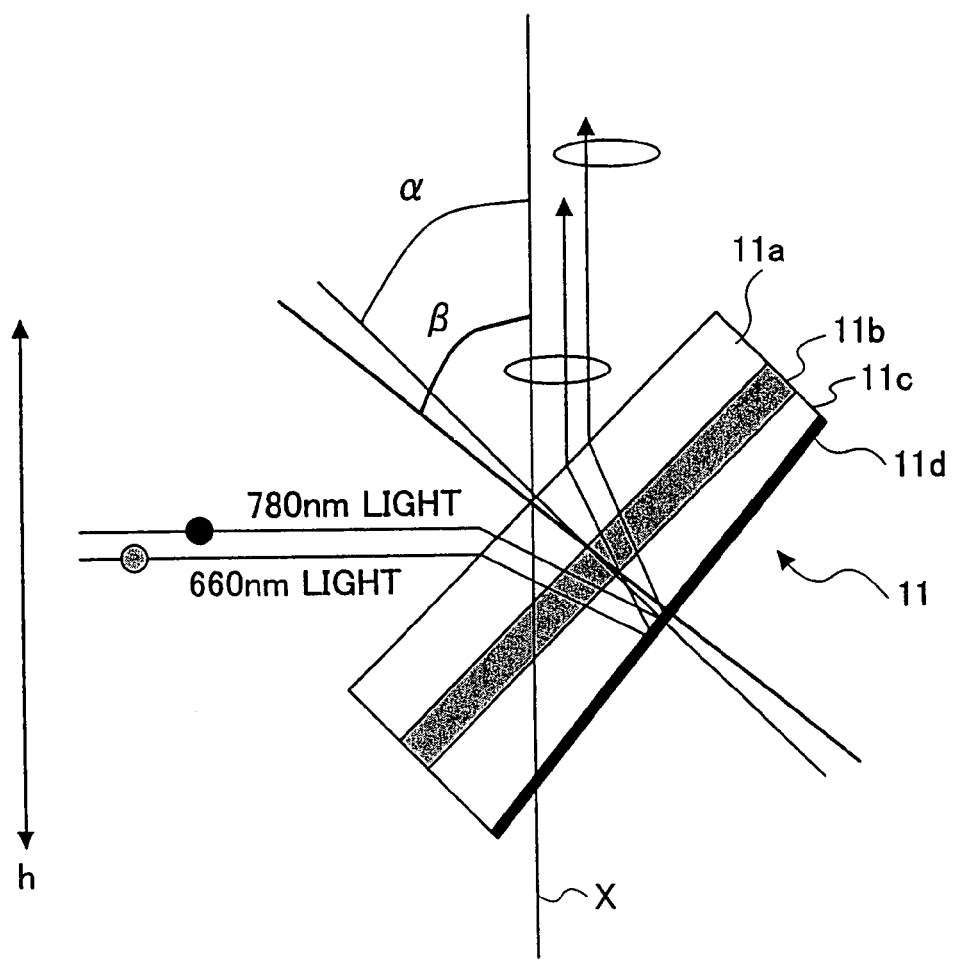
FIG. 19 is a diagram for illustrating a configuration and an effect of the optical element of FIG. 16 according to a 13th embodiment of the present invention.

FIG. 19 is a diagram for illustrating a configuration and an effect according to a 13th embodiment of the present invention. In FIG. 19, the optical element 11 includes the glass substrate 11a, the phase difference film 11b, the edge prism 11c, and the total reflection film 11d. The optical axis of the objective lens 7 is indicated by a line X. In this embodiment, the optical pickup element is reduced in thickness by employing the optical element 11 of the 11th embodiment shown in FIG. 16. As previously described in the 11th embodiment, the optical element 11 provides the phase difference of the ¼ wavelength to the lights of the DVD and CD wavelengths on the assumption that recording or reproduction is performed on both CDs and DVDs, and also functions as an upward reflection mirror so as to make the lights incident on the objective lens 7. Further, the optical element 11 is provided with the beam-shaping function.

The edge prism 11c is thicker on the incidence side on which a light emitted from the light source is made incident, and is thinner on the emission side from which the light is emitted toward the objective lens 7. At this point, the normal line of the total reflection surface of the total reflection film 11d is inclined at an angle β to the optical axis X of the objective lens 7. β should be smaller than 45° in order that the light reflected from the total reflection surface is emitted parallel to the optical axis X of the objective lens 7. Further, an inclination α of the normal line of the incidence-side surface of the glass substrate 11a to the optical axis X of the objective lens 7 should be smaller than 45° as well.

An angle formed between the normal line of the mirror surface of the conventional upward reflection mirror and the optical axis X of an objective lens is 45°, while this angle is smaller than 45° in the optical element having the above-described edge-prism shape of this embodiment. Therefore, the optical pickup unit is prevented from having an increase in its thickness in a vertical direction indicated by arrow h in FIG. 19, or the optical pickup unit can be reduced in thickness in the vertical direction.

Figure 20:
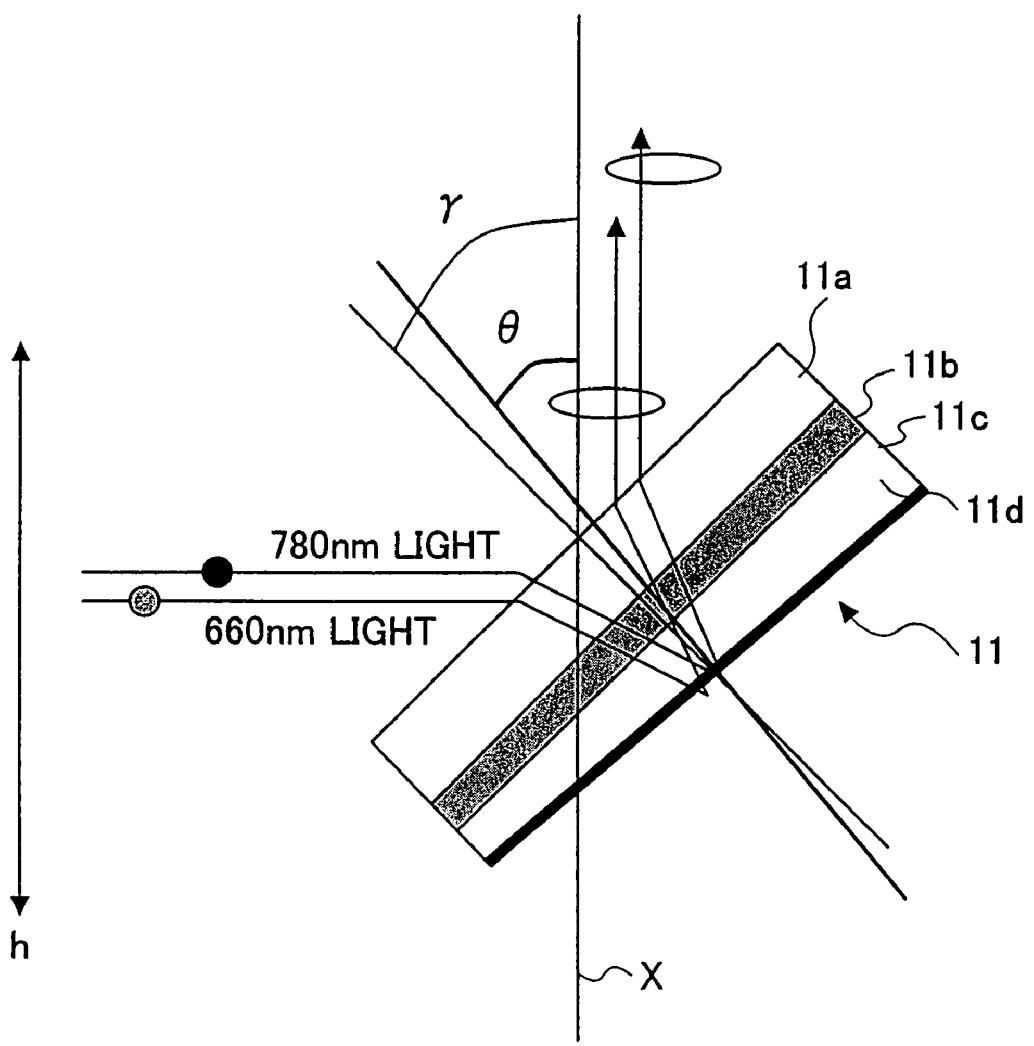
FIG. 20 is a diagram for illustrating a comparative example in an arrangement of a beam-shaping part.

On the other hand, if the edge prism 11c is formed to be thicker on the emission side as shown in FIG. 20, an angle γ formed between the normal line of the total reflection surface of the total reflection film lid and the objective lens 7 becomes larger than 45°. Therefore, the optical pickup unit cannot be reduced in thickness in the vertical direction. That is, by using a prism formed to be thinner on the emission side from which a light is emitted toward an objective lens as shown in this embodiment, an optical pickup unit can be reduced in thickness so as to be suitably mounted in mobile computers such as notebook personal computers.

The optical pickup unit according to this embodiment can be reduced in thickness so as to be easily employed in notebook computers or other mobile apparatuses by arranging the optical element 11 so that the normal line of the total reflection surface of the total reflection film 11d is inclined at an angle smaller than 45° to the optical axis X of the objective lens 7. By this arrangement, the optical element 11 is thinner in the vertical direction than the conventional upward reflection mirror.

14th Embodiment

In the 11th and 13th embodiments, the phase difference of the ¼ wavelength is provided to both lights of the two wavelengths and beam shaping is performed by the prism for beam shaping. By using chromatic aberration that the beam-shaping prism has for a light passing therethrough, each of lights of 650 and 780 nm wavelengths can be incident on an objective lens at an incident angle matching the optical axis of the objective lens even if the lights are emitted from different points. Recently, a monolithic LD that is a single LD chip including two light emission points for 650 and 780 nm and a single-package pickup in which two LD chips are provided closely to each other in one package have been proposed for the purpose of downsizing optical pickup units.

Figure 21:
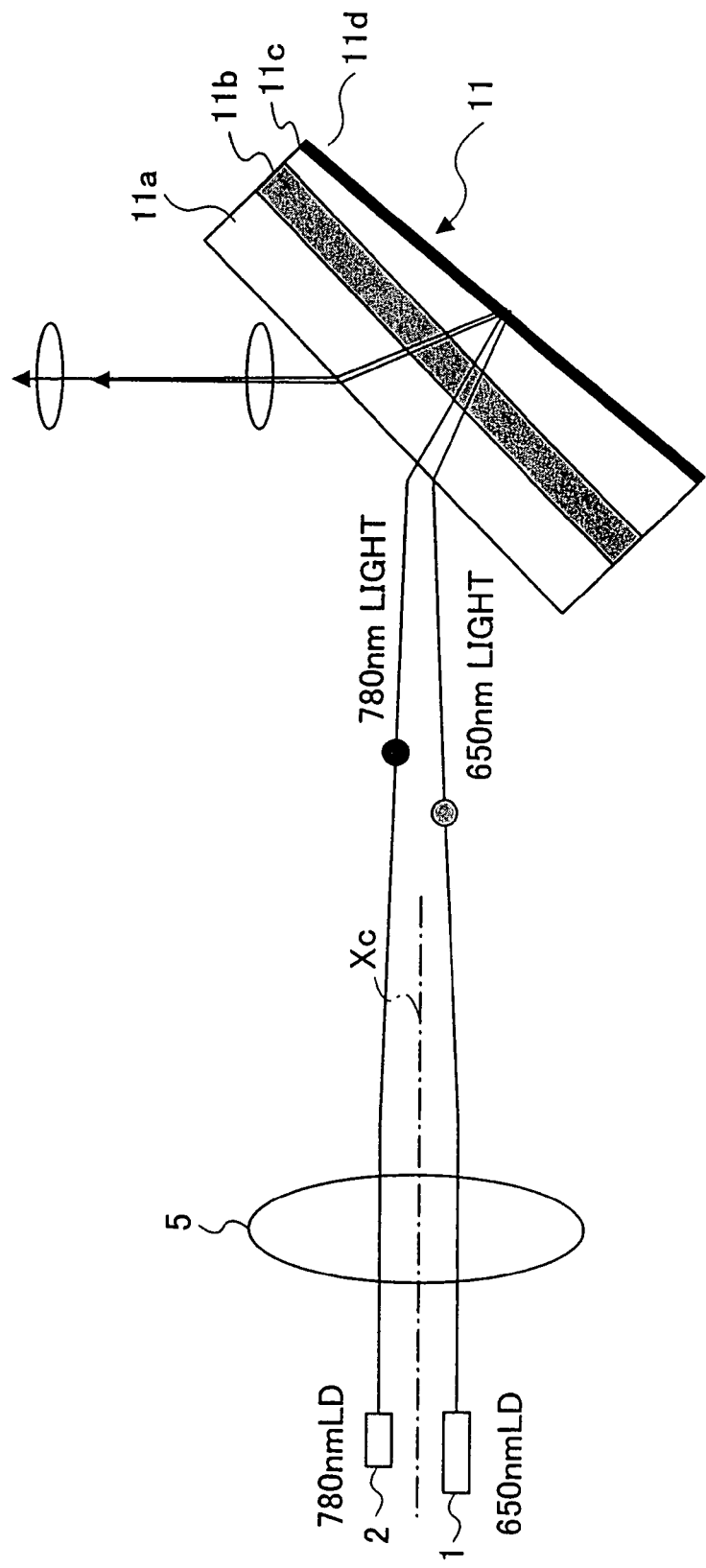
FIG. 21 is a diagram for illustrating light paths relating to an arrangement of two light sources provided in a single package in an optical pickup unit.

FIG. 21 is a diagram for illustrating light paths relating to the arrangement of two light sources provided in a single package in an optical pickup unit. In the case of employing the above-described light sources, the two light-emission points (the LD 1 of 650 nm and the LD 2 of 780 nm) cannot be provided on an optical axis Xc of the collimator lens 5 at the same time. Therefore, both light-emission points are provided in positions offset from the optical axis Xc of the collimator lens 5. In the configuration shown in FIG. 21, each of the lights travels in its light path non-parallel to the optical axis Xc with an inclination after being emitted from the collimator lens 5. Therefore, if each of the lights continues to travel as it is, each of the lights is made incident on the objective lens with the inclination, so that coma is caused in a spot into which each of the lights is converged on the optical recording medium 108.

Therefore, in this embodiment, by using the chromatic aberration of the edge prism 11c of the optical element 11, the optical axis of an incident light on the objective lens is caused to coincide with, or at least be parallel to, the optical axis of the objective lens. As shown in FIG. 21, by selecting materials for the edge prism 11c and the glass substrate 11a of the optical element 11 so that optimum chromatic aberration is provided to each of the lights of the wavelengths of 650 and 780 nm, the optical axis of the incident light on the objective lens 7 can coincide with or be parallel to the optical axis thereof. Thereby, no coma is caused in the spot into which each of the lights is converged on the optical recording medium 8.

According to this embodiment, even when the positions of light-emission points are different so that lights are made incident on an optical element at different angles in the case of providing semiconductor lasers in a single package, an excellent beam spot can be obtained with coma being controlled by causing the optical axis of the incident light on an objective lens to coincide with, or at least be parallel to, the optical axis thereof in the optical element. Further, the lights of the different wavelengths are allowed to have optical axes that are parallel to the optical axis of the objective lens when the lights are made incident thereon. Therefore, the amount of movement of an actuator may be equal to that of the conventional actuator, thus causing no load increase to the actuator.

15th Embodiment

Figure 22:
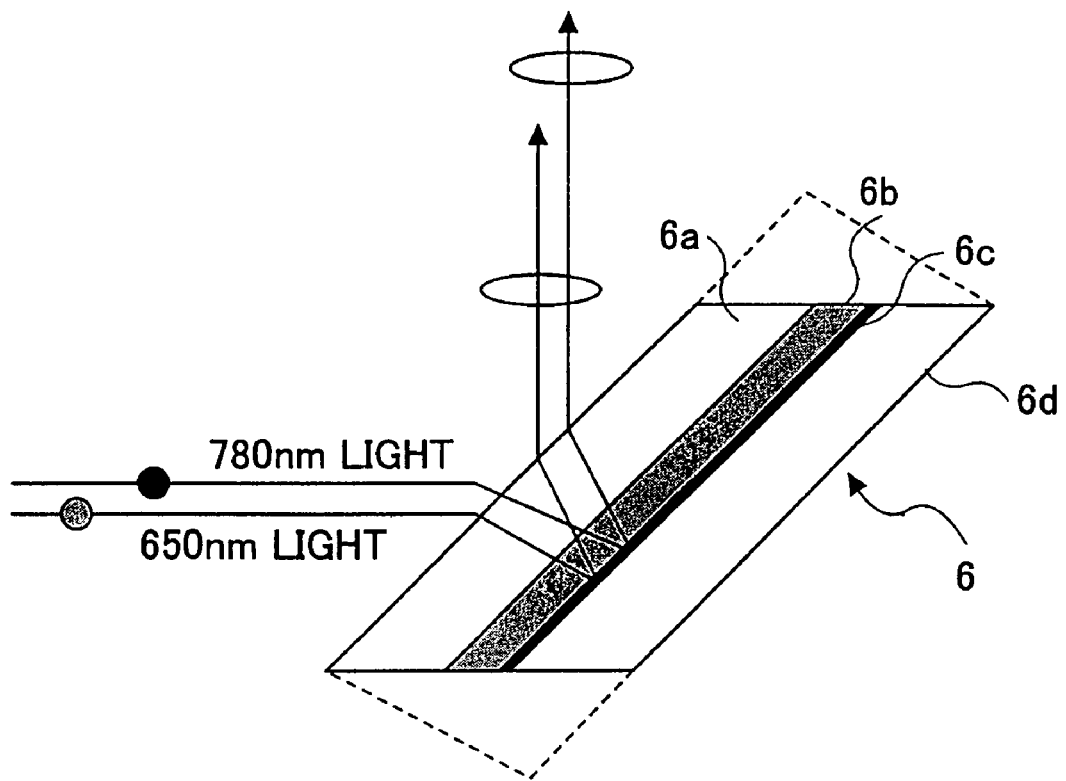
FIG. 22 is a diagram for illustrating a 15th embodiment of the present invention.

FIG. 22 is a diagram showing the optical element 6 for illustrating a 15th embodiment of the present invention.

In this embodiment, any of the optical pickup units of the above-described embodiments has its shape defined so that a drive unit is reduced in thickness in the vertical direction. Specifically, as shown in FIG. 22, the optical pickup unit can be reduced in thickness by processing the optical element 6 so that the bottom and top surfaces thereof are perpendicular (at 90°) to the optical axis of the objective lens 7.

When the upper glass plate 6a, the phase difference film 6b, the total reflection film 6c, and the lower glass plate 6d are layered one over the other, normally, a layered structure having rectangular sides is obtained. When the layered structure is employed as the optical element 6, which is provided with an inclination in each optical pickup unit, the layered structure or the optical element 6 has its surfaces ground so as to be reduced in height when incorporated into each optical pickup unit. Thereby, each optical pickup unit can be reduced in thickness. That is, by processing the optical element 6 so that the optical element 6 has surfaces perpendicular to the optical axis of the objective lens 7, each optical pickup unit can be reduced in thickness so as to be suitably employed in notebook personal computers or other mobile apparatuses.

16th Embodiment

In increasing the recording rate of the optical pickup unit, it is more advantageous to employ a single-beam tracking method than a three-beam tracking method since the amount of light of a main beam is greater in the former than in the latter. On the other hand, the single-beam tracking method causes a great offset in a tracking signal at the time of shifting an objective lens. Therefore, the single-beam tracking method is less accurate in track detection. Accordingly, with the development of a mirror-combined actuator actuating a mirror as well as an objective lens, there has been proposed a single-beam tracking method that prevents a great offset from being caused in a tracking signal. Such a method is disclosed, for instance, in Japanese Laid-Open Patent Application No. 9-180207.

According to the method disclosed therein, a light emitted from a light source is reflected by a mirror to be directed to an objective lens. Therefore, compared with the conventional actuator, the number of reflection surfaces is increased by two; one in a light path to and one in a light path back from an optical recording medium. When a circularly polarized light is incident on the reflection surface, a phase difference is caused in the light. Therefore, in the method using the mirror-combined actuator, such a phase difference may be controlled by making a linearly polarized light incident on the reflection surface in a light path up to the mirror of the mirror-combined actuator. Accordingly, by having a linearly polarized light in a light path up to the mirror of the mirror-combined actuator and converting the linearly polarized light to a circularly polarized light in an upward reflection mirror part provided immediately before the objective lens as shown in this embodiment, a phase difference can be reduced in amount even if there are a large number of reflection surfaces.

In a configuration shown in FIG. 11, for instance, a phase difference caused by a mirror can be controlled by having a linearly polarized light traveling up to the mirror of the mirror-combined actuator 13 without providing a ¼ wave plate in the hologram unit 15 and converting the linearly polarized light to a circularly polarized light by using an optical element of the present invention. That is, by mounting an optical element of the present invention in an actuator actuating an objective lens and a mirror together, track detection can be performed with a single beam, which is suitable for high-speed recording. Further, a phase difference caused by a mirror can be controlled, so that good signal detection can be performed without signal deterioration.

17th Embodiment

Figure 23:
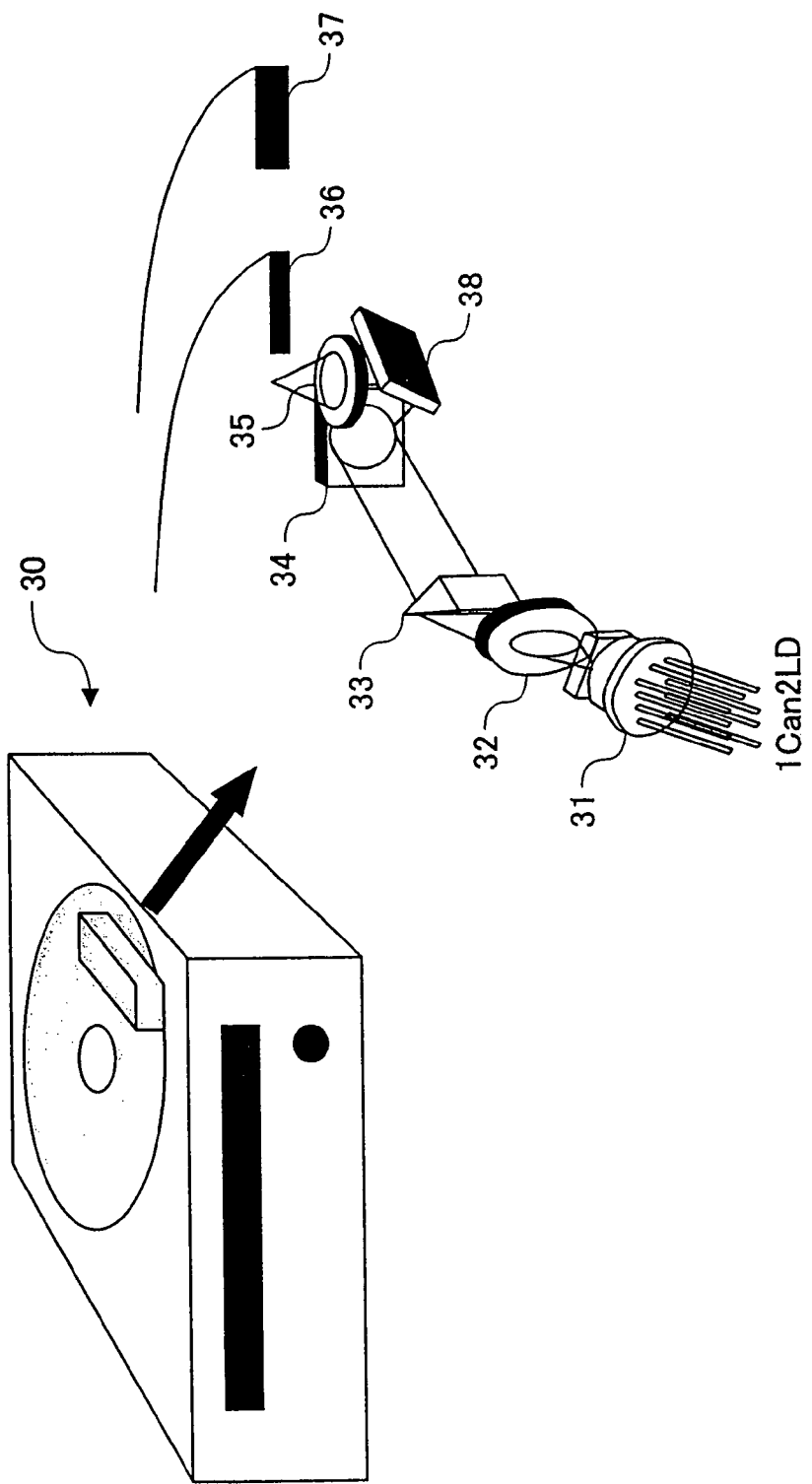
FIG. 23 is a diagram showing an optical disk drive unit according to a 17th embodiment of the present invention.

FIG. 23 is a diagram showing an optical disk drive unit 30. The optical disk drive unit 30 includes a two-wavelength polarization hologram 31, a two-wavelength achromatic lens 32, a three-wavelength beam-shaping prism 33, a movable mirror 34, an objective lens 35, a DVD disk 36, a CD disk 37, and a broadband ¼ wavelength upward reflection mirror (a broadband ¼ wave plate) 38 according to the present invention. When an optical pickup unit of the present invention is mounted in the optical disk drive unit 30, the broadband ¼ wave plate 38 circularly polarizes lights of the two wavelengths, so that the usability of each light is improved, realizing an optical disk drive unit having a high recording rate. Further, a returning light to the LD has its polarization direction turned so that noise generation is reduced in the LD, thereby realizing a highly reliable recording and reproduction characteristic. Each of the optical pickup units of the above-described embodiments minimizes signal deterioration caused by a phase difference so as to be capable of performing signal detection with high sensitivity. Further, each of the above-described optical units obtains high usability of light and can be reduced in thickness. Therefore, according to the present invention, an optical disk drive unit suitable for an environment requiring portability and a longer operable period with a limited power supply such as a battery can be realized. Such an optical disk drive unit is suitably used as a drive unit housed in a notebook personal computer.

The present invention is not limited to the specifically disclosed embodiments, but variations and modifications may be made without departing from the scope of the present invention.

The present application is based on Japanese priority applications No. 2001-063513 filed on Mar. 7, 2001 and No. 2001-290046 filed on Sep. 21, 2001, the entire contents of which are hereby incorporated by reference.

What is claimed is:

1. An optical element, comprising:
   a ¼ wave plate configured to provide a phase difference of a ¼ wavelength to light beams of a plurality of wavelength; and
   a total reflection part configured to reflect the light beams of the plurality of wavelengths,
   wherein a light beam incident on the optical element is effected twice by said ¼ wave plate before being emitted the optical element by being first effected by said ¼ wave plate, then reflected from said total reflection part, and again incident on said ¼ wave plate.

2. An optical element, comprising:
   a ¼ wave plate configured to provide a phase difference of a ¼ wavelength to the light beams of a plurality of wavelengths; and
   a total reflection part configured to reflect the light beams of the wavelengths,
   wherein said ¼ plates includes a plurality of stacked organic films of different wavelength dispersion characteristics.

3. A pickup unit, comprising:
   a light source configured to emit light beams of a plurality of wavelengths; and
   the optical element as set forth in claim 1.

4. An optical disk drive unit, comprising:
   a light source configured to emit light beams of a plurality of wavelengths; and
   the optical element as set forth in claim 2.

5. An optical disk drive unit, comprising:
   a pickup unit,
   the pickup unit including
       a light source configured to emit light beams of a plurality of wavelengths; and
       the optical element as set forth in claim 1.

6. An optical disk drive unit, comprising;
   a pickup unit,
   the pickup unit including
       a light source configured to emit light beams of a plurality of wavelengths; and
       the optical element as set forth in claim 2.

* * * * *